United States Patent
Kisoda et al.

(10) Patent No.: US 7,929,627 B2
(45) Date of Patent: Apr. 19, 2011

(54) OFDM RECEIVER, INTEGRATED CIRCUIT AND RECEIVING METHOD

(75) Inventors: Akira Kisoda, Osaka (JP); Noritaka Iguchi, Osaka (JP); Koji Setoh, Osaka (JP)

(73) Assignee: Panasonic Corporation, Osaka (JP)

( * ) Notice: Subject to any disclaimer, the term of this patent is extended or adjusted under 35 U.S.C. 154(b) by 907 days.

(21) Appl. No.: 11/885,042

(22) PCT Filed: Feb. 28, 2006

(86) PCT No.: PCT/JP2006/304212
§ 371 (c)(1),
(2), (4) Date: Aug. 24, 2007

(87) PCT Pub. No.: WO2006/093307
PCT Pub. Date: Sep. 8, 2006

(65) Prior Publication Data
US 2008/0165871 A1  Jul. 10, 2008

(30) Foreign Application Priority Data

Mar. 1, 2005  (JP) ................................. 2005-055537
Jun. 29, 2005  (JP) ................................. 2005-190544

(51) Int. Cl.
*H04L 27/28* (2006.01)
(52) U.S. Cl. ...................................................... 375/260
(58) Field of Classification Search .................. 375/260, 375/261, 130, 147, 316; 455/136, 138, 245.1
See application file for complete search history.

(56) References Cited

U.S. PATENT DOCUMENTS

2004/0229581 A1* 11/2004 Mizoguchi et al. ........... 455/136
2009/0231994 A1*  9/2009 Kawauchi et al. ........... 370/210

FOREIGN PATENT DOCUMENTS

| CN | 1420648 | 5/2003 |
| EP | 0 898 381 | 2/1999 |
| EP | 1 313 282 | 5/2003 |
| JP | 3027362 | 1/2000 |
| JP | 3084368 | 6/2000 |
| JP | 2004-282613 | 10/2004 |

OTHER PUBLICATIONS

Speth et al., "Optimum Receiver Design for OFDM-Based Broadband Transmission—Part II: As Case Study", *IEEE Transactions on Communications*, vol. 49, No. 4, Apr. 2001.
Dowler et al., "Performance Evaluation of Channel Estimation Techniques in a Multiple Antenna OFDM System", *Vehicular Technology Conference*, vol. 12, pp. 1214-1218, Oct. 2003.

* cited by examiner

*Primary Examiner* — Khai Tran
(74) *Attorney, Agent, or Firm* — Wenderoth, Lind & Ponack, L.L.P.

(57) ABSTRACT

A mobile receiver performs oblique interpolation in such a direction that a symbol number increases by one and a carrier number decreases by three with respect to a position of each Scattered Pilot Signal to interpolate a first signal whose channel characteristics have not been obtained. The mobile receiver then performs, in a frequency axis direction, frequency axis interpolation to interpolate channel characteristics of a second signal whose channel characteristics have not been obtained, using the estimated channel characteristics and the interpolated channel characteristics.

15 Claims, 22 Drawing Sheets

OFDM RECEIVER, INTEGRATED CIRCUIT AND RECEIVING METHOD

BACKGROUND OF THE INVENTION

1. Technical Field

The present invention relates to a receiver, an integrated circuit and a receiving method for use in digital terrestrial broadcasting based on OFDM (Orthogonal Frequency Division Multiplex) method.

2. Background Art

OFDM method is applied to digital terrestrial broadcasting in Japan and Europe.

In ISDB-T (Integrated Services Digital Broadcasting-Terrestrial) system and DVB-T (Digital Video Broadcasting-Terrestrial) system, pilot signals, whose amplitude and phase are known, are scattered in a frequency domain in sub-carriers. Such pilot signals are called Scattered Pilot Signals (hereinafter called the "SP signals").

The following describes the arrangement of the SP signals, with reference to FIG. 20. FIG. 20 shows the arrangement of the SP signals in an OFDM signal. Each SP signal is not transmitted by each sub-carrier, but arranged, in the frequency axis direction and the time axis direction, at a position where a carrier number k in a segment satisfies k=3(n mod 4)+12p, where mod is a modulus operator, p is an integer, and n is a symbol number. In other words, the SP signals are arranged in cycles of twelve sub-carriers in the frequency axis direction as FIG. 20 shows. The SP signals are also repeated in cycles of four symbols in the time axis direction. Each SP signal is shifted by three carriers as the symbol number increases by one. Here, note that Continuous Pilot Signals (hereinafter called the "CP signals") and control information signals are arranged at predetermined sub-carrier positions in the OFDM signal, and information transmission signals are arranged at the other positions.

Each SP signal is transmitted after being modulated into a binary signal by the transmitter, based on a predetermined pattern determined according to the sub-carrier position of the SP signal. The receiver adjusts the phase of the SP signal, and performs interpolation in the frequency axis direction (hereinafter called the "frequency axis interpolation") and interpolation in the time axis direction (Hereinafter called the "time axis interpolation") to estimate channel characteristics. Then, the receiver equalizes the received signals based on the estimation.

The time axis interpolation above is described in Patent Document 1 (Japanese Patent Publication No. 3027362) and Patent Document 2 (Japanese Patent Publication No. 3084368) for instance, which are explained next with reference to FIG. 21 and FIG. 22. FIG. 21 is a drawing for explaining the time axis interpolation, and FIG. 22 is a drawing which shows positions of signals whose channel characteristics are interpolated by the time axis interpolation. Note that FIG. 21 only focuses on particular sub-carriers that carry the SP signals.

As FIG. 21 (a) shows, in the time axis interpolation described in the Patent Document 1, the channel characteristics of each SP signal position are kept until next SP signal in the time axis direction. In other words, the same channel characteristics as the channel characteristics of the previous symbol are used for interpolating a symbol whose carrier number is k=3(n mod 4)+12p and by which the SP signal is not carried. This means that the same channel characteristics are used for three symbols at a maximum.

As FIG. 21 (b) shows, in the time axis interpolation described in Patent Document 2, the channel characteristics of the carrier positions are liner-interpolated among symbols, using the channel characteristics of each SP signal position. In circumstances where the channel characteristics vary, this time axis interpolation can more accurately estimate the channel characteristics compared to the time axis interpolation described in Patent Document 1.

In the manner described above, the interpolation is performed in the time axis direction to interpolate the channel characteristics of each signal position shown in FIG. 22.

Patent Document 3 (Japanese Laid-open Patent Application Publication No. 2004-282613) describes, although not in detail, switching between the interpolation processing of Patent Document 1 or Patent Document 2 and interpolation processing that performs filtering in the time axis direction in accordance with the receiving condition. If the filtering is performed in the time axis direction, the interpolation accuracy is expected to be improved compared to the Patent Document 1 and Patent Document 2.

In the case of performing the above-described time axis interpolation, the SP signal is arranged in cycles of four symbols. This means that the SP signal appears once in every four symbols in the time axis direction. The sampling rate in the time axis direction is fs/4, where the inverse of the symbol length is fs. Therefore, according to the sampling theorem, the Doppler frequency up to fs/8 is manageable. For instance, in the case where the guard interval parameter (the proportion of the guard interval length to the effective symbol length) is ⅛ in the mode 3 of the ISDB-T system, the effective symbol length is 1008 μs, the guard interval length is 126 μs, and the symbol length is 1134 μs. Therefore, the fs is 881 Hz (=1/1134 μs), and the equalization up to the Doppler frequency at 110 Hz is possible in principle.

SUMMARY OF THE INVENTION

However, if the receiver is mounted on a car, for instance, and the car is moving, the maximum Doppler frequency is determined by the frequency of the channel to which the receiver is tuned and the moving speed of the receiver. The maximum Doppler frequency increases as the moving speed of the receiver increases. If the moving speed increases and the Doppler frequency becomes more than fs/8, which is the maximum frequency that the interpolation performed in the time axis direction is applicable to, the accuracy of the transmission path property estimation will be decreased.

The present invention focuses on the arrangement of the SP signals in order to provide a receiver, an integrated circuit and a receiving method that are capable of equalizing a higher Doppler frequency compared to the conventional receiver.

To fulfill the above-described object, the present invention provides a receiver that receives an OFDM signal in which a Scattered Pilot Signal is scattered every first predetermined number of carriers arranged in a frequency axis direction, and shifted by a second predetermined number of carriers as a symbol number increases by one, the receiver comprising: a first division unit operable to divide each Scattered Pilot Signal by a known signal, which is the same as the Scattered Pilot Signal at a time of transmission, to estimate channel characteristics of a position of each Scattered Pilot Signal; an interpolation unit operable (i) to perform oblique interpolation using the estimated channel characteristics, to interpolate channel characteristics of a first signal position whose channel characteristics have not been obtained, the position of the Scattered Pilot Signal and the first signal position being on a same straight line and having different symbol numbers and different carrier numbers, and (ii) to perform, in a frequency axis direction, frequency axis interpolation using the estimated channel characteristics and the interpolated channel characteristics, to interpolate channel characteristics of a second signal position whose channel characteristics have not been obtained; and a second division unit operable to divide an information transmission signal, which is included in the OFDM signal, by the estimated channel characteristics.

The present invention also provides an integrated circuit that receives an OFDM signal in which a Scattered Pilot Signal is scattered every first predetermined number of carriers arranged in a frequency axis direction, and shifted by a second predetermined number of carriers as a symbol number increases by one, the integrated circuit comprising: a first division unit operable to divide each Scattered Pilot Signal by a known signal, which is the same as the Scattered Pilot Signal at a time of transmission, to estimate channel characteristics of a position of each Scattered Pilot Signal; an interpolation unit operable (i) to perform oblique interpolation using the estimated channel characteristics, to interpolate channel characteristics of a first signal position whose channel characteristics have not been obtained, the position of the Scattered Pilot Signal and the first signal position being on a same straight line and having different symbol numbers and different carrier numbers, and (ii) to perform, in a frequency axis direction, frequency axis interpolation using the estimated channel characteristics and the interpolated channel characteristics, to interpolate channel characteristics of a second signal position whose channel characteristics have not been obtained, and a second division unit operable to divide an information transmission signal, which is included in the OFDM signal, by the estimated channel characteristics.

The present invention also provides a receiving method for receiving an OFDM signal in which a Scattered Pilot Signal is scattered every first predetermined number of carriers arranged in a frequency axis direction, and shifted by a second predetermined number of carriers as a symbol number increases by one, the receiving method comprising: a first division step of dividing each Scattered Pilot Signal by a known signal, which is the same as the Scattered Pilot Signal at a time of transmission, to estimate channel characteristics of a position of each Scattered Pilot Signal; an interpolation step of (i) performing oblique interpolation using the estimated channel characteristics, to interpolate channel characteristics of a first signal position whose channel characteristics have not been obtained, the position of the Scattered Pilot Signal and the first signal position being on a same straight line and having different symbol numbers and different carrier numbers, and (ii) performing, in a frequency axis direction, frequency axis interpolation using the estimated channel characteristics and the interpolated channel characteristics, to interpolate channel characteristics of a second signal position whose channel characteristics have not been obtained, and a second division step of dividing an information transmission signal, which is included in the OFDM signal, by the estimated channel characteristics.

According to the above-described receiver, integrated circuit and receiving method, the direction of the oblique interpolation is appropriately selected. Accordingly, in the oblique interpolation, the SP signal appears in the symbols more frequently compared to the time axis interpolation. To perform the interpolation, each of the above-described receiver, integrated circuit and receiving method uses the SP signal, which appears more frequently in the symbols. Accordingly, the manageable Doppler frequency becomes higher compared to the conventional time axis interpolation. As a result, even in the case where the receiver moves at high speed, the channel characteristics can be estimated accurately.

In the above-described receiver, the first predetermined number may be twelve and the second predetermined number may be three, and the interpolation unit may perform the oblique interpolation in such a direction that the symbol number increases by one and the carrier number decreases by one with respect to the position of each Scattered Pilot Signal.

With the stated structure, the SP signal appears once in every three symbols in contrast to the conventional technique in which the SP signal appears once in every four symbols. Since the receiver performs the interpolation using the SP signal which appears more frequently, the manageable Doppler frequency becomes higher compared to the conventional time axis interpolation. As a result, even in the case where the receiver moves at high speed, the channel characteristics can be estimated accurately. Also, since the SP signals are arranged in conformity to the ISDB-T system, the DVB-T system and the like, the present invention is applicable to the ISDB-T system and the DVB-T system without any modification.

In the above-described receiver, the interpolation unit may perform the oblique interpolation in such a direction that the symbol number increases by one and the carrier number decreases by the second predetermined number with respect to the position of each Scattered Pilot Signal.

With the stated structure, the SP signal appears once in every two symbols in contrast to the conventional technique in which the SP signal appears once in every four symbols. Since the receiver performs the interpolation using the SP signal which appears more frequently, the manageable Doppler frequency becomes higher compared to the conventional time axis interpolation. As a result, even in the case where the receiver moves at high speed, the channel characteristics can be estimated accurately.

In the above-described receiver, the first predetermined number may be twelve and the second predetermined number may be three, and the interpolation unit may perform the oblique interpolation in such a direction that the symbol number increases by one and the carrier number decreases by three with respect to the position of each Scattered Pilot Signal.

With the stated structure, the SP signal appears once in every two symbols in contrast to the conventional technique in which the SP signal appears once in every four symbols. Since the receiver performs the interpolation using the SP signal which appears more frequently, the manageable Doppler frequency becomes higher compared to the conventional time axis interpolation. As a result, even in the case where the receiver moves at high speed, the channel characteristics can be estimated accurately. Also, since the SP signals are arranged in conformity to the ISDB-T system, the DVB-T system and the like, the present invention is applicable to the ISDB-T system and the DVB-T system without any modification.

In the above-described receiver, after performing the oblique interpolation, the interpolation unit may perform, in a time axis direction, time axis interpolation using the estimated channel characteristics and the interpolated channel characteristics, to interpolate channel characteristics of a third signal position whose channel characteristics have not been obtained, and then perform the frequency axis interpolation.

With the stated structure, the receiver performs the time axis interpolation after performing the oblique interpolation. Accordingly, the number of SP signals used for the estimation of the channel characteristics of one symbol increases, and the maximum value of the delay time of the delayed wave that can be managed by the receiver becomes larger compared to the case of not performing the time axis interpolation.

In the above-described receiver, the interpolation unit may change a direction of the oblique interpolation in accordance with a ratio of a guard interval length to an effective symbol length.

With the stated structure, the receiver can manage the delayed wave whose delay time is the maximum value of the guard interval length. At the same time, the manageable Doppler frequency can be heightened.

In the above-described receiver, the interpolation unit may judge whether to perform the oblique interpolation based on a ratio of a guard interval length to an effective symbol length.

With the stated structure, the receiver can manage the delayed wave whose delay time is the maximum value of the guard interval length. At the same time, the manageable Doppler frequency can be heightened.

In the above-described receiver, the interpolation unit may replace, in accordance with a ratio of a guard interval length, the oblique interpolation with time axis interpolation performed in a time axis direction and using the estimated channel characteristics, to interpolate channel characteristics of a third signal position whose channel characteristics have not been obtained.

With the stated structure, the receiver can manage the delayed wave whose delay time is the maximum value of the guard interval length. At the same time, the manageable Doppler frequency can be heightened.

In the above-described receiver, the interpolation unit may change a direction of the oblique interpolation in accordance with a maximum delay time of a delayed wave with respect to a principal wave, the maximum delay time being indicated by a delay profile.

With the stated structure, the receiver can manage the delayed wave whose delay time is the expected maximum value. At the same time, the manageable Doppler frequency can be heightened.

In the above-described receiver, the interpolation unit may judge whether to perform the oblique interpolation based on a maximum delay time of a delayed wave with respect to a principal wave, the maximum delay time being indicated by a delay profile.

With the stated structure, the receiver can manage the delayed wave whose delay time is the expected maximum value. At the same time, the manageable Doppler frequency can be heightened.

In the above-described receiver, the interpolation unit may replace, in accordance with a maximum delay time of a delayed wave with respect to a principal wave, the oblique interpolation with time axis interpolation performed in a time axis direction and using the estimated channel characteristics, to interpolate channel characteristics of a third signal position whose channel characteristics have not been obtained, the delay time being indicated by a delay profile.

With the stated structure, the receiver can manage the delayed wave whose delay time is the expected maximum value. At the same time, the manageable Doppler frequency can be heightened.

The above-described receiver may further comprise: a filter unit operable to perform, using the estimated channel characteristics, filtering in such a direction that both the symbol number and the carrier number change, with respect to the position of each Scattered Pilot Signal, wherein the interpolation unit may use channel characteristics resultant from the filtering, instead of the estimated channel characteristics.

With the stated structure, the noises included in the channel characteristics of the SP signal position estimated by the first division unit can be removed. Therefore, the receiver can estimate the channel characteristics more accurately.

Also, the receiver according to the present invention is a receiver that receives an OFDM signal in which a Scattered Pilot Signal is scattered every first predetermined number of carriers arranged in a frequency axis direction, and shifted by a second predetermined number of carriers as a symbol number increases by one, the receiver comprising: a first division unit operable to divide each Scattered Pilot Signal by a known signal, which is the same as the Scattered Pilot Signal at a time of transmission, to estimate channel characteristics of a position of each Scattered Pilot Signal; an interpolation unit operable to perform, in a frequency axis direction, frequency axis interpolation using the estimated channel characteristics, to interpolate channel characteristics of a signal position whose channel characteristics have not been obtained; and a second division unit operable to divide an information transmission signal, which is included in the OFDM signal, by the estimated channel characteristics.

With the stated structure, the SP signal appears in every symbol in contrast to the conventional technique in which the SP signal appears once in every four symbols. Since the receiver performs the interpolation using the SP signal which appears more frequently, the manageable Doppler frequency becomes higher compared to the conventional time axis interpolation. As a result, even in the case where the receiver moves at high speed, the channel characteristics can be estimated accurately.

DETAILED DESCRIPTION OF THE INVENTION

The First Embodiment

The following describes the first embodiment of the present invention, with reference to the drawings. Note that in the case of the ISDB-T system and the DVB-T system, a parameter for the guard interval is selectable from ¼, ⅛, 1/16 and 1/32.

<Overall Structure>

Figure 1:
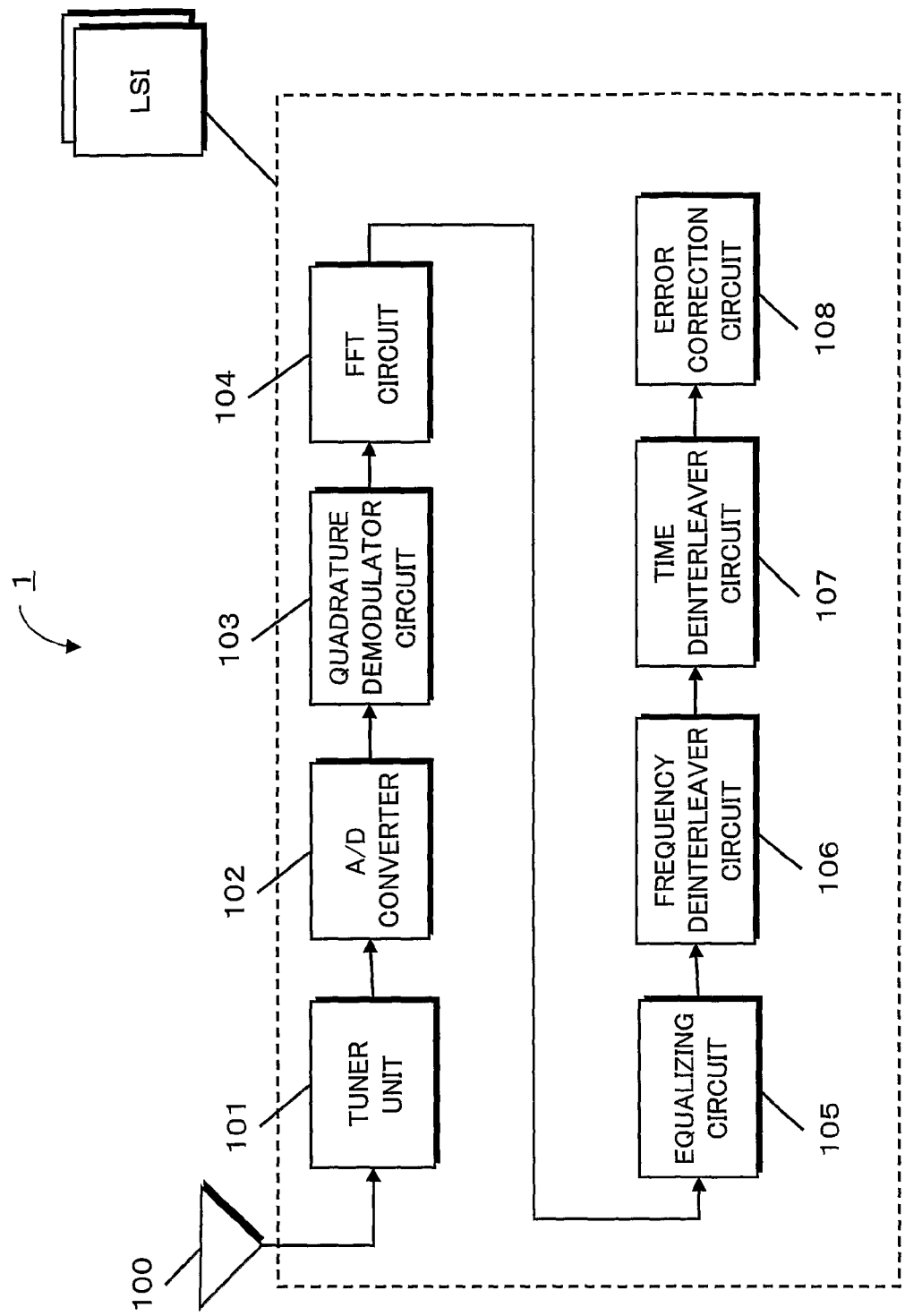
FIG. 1 is a block diagram showing an overall structure of a receiver according to the first embodiment.

The following describes the overall structure of an OFDM receiver according to the first embodiment, with reference to FIG. 1. FIG. 1 is a block diagram showing the overall structure of a receiver in conformity to the ISDB-T system.

A receiver 1 includes an antenna 100, a tuner unit 101, an A/D converter 102, a quadrature demodulator circuit 103, an FFT (Fast Fourier Transform) circuit 104, an equalizing circuit 105, a frequency deinterleaver circuit 106, a time deinterleaver circuit 107 and an error correction circuit 108. Note that a synchronization circuit is not illustrated in FIG. 1.

The antenna 100 receives an OFDM signal and outputs the signal to the tuner unit 101. The tuner unit 101 tunes in to the OFDM signal input from the antenna unit 100, down-converts the OFDM signal to a predetermined frequency and outputs the resultant signal to the A/D converter 102. The A/D converter 102 converts the input analog signal to a digital signal, and outputs the digital signal to the quadrature demodulator circuit 103. The quadrature demodulator circuit 103 performs a quadrature demodulation on the digital signal, and outputs the signal resultant from the quadrature demodulation to the FFT circuit 104.

The FFT circuit 104 performs Fast Fourier Transform on the signal resultant from the quadrature demodulation, to convert the signal to the frequency domain, and outputs the signal to the equalizing circuit 105. The equalizing circuit 105 equalizes the signal resultant from the Fast Fourier Transform performed by the FFT circuit 104, and outputs the equalized signal to the frequency deinterleaver circuit 106. The frequency deinterleaver circuit 106 performs frequency deinterleave processing on the signal equalized by the equalizing circuit 105, and the time deinterleaver circuit 107 performs time deinterleave processing on the signal resultant from the frequency deinterleave processing. The error correction circuit 108 performs error correction processing on the signal resultant from the time deinterleave processing.

Note that although the equalizing circuit 105 is described later in detail, the explanations of the other circuits are omitted, because they perform well-known operations.

Also note that the DVB-T system does not use a time deinterleaver circuit, but performs almost the same operations as the ISDB-T system does.

<Structure of Equalizing Circuit>

Figure 2:
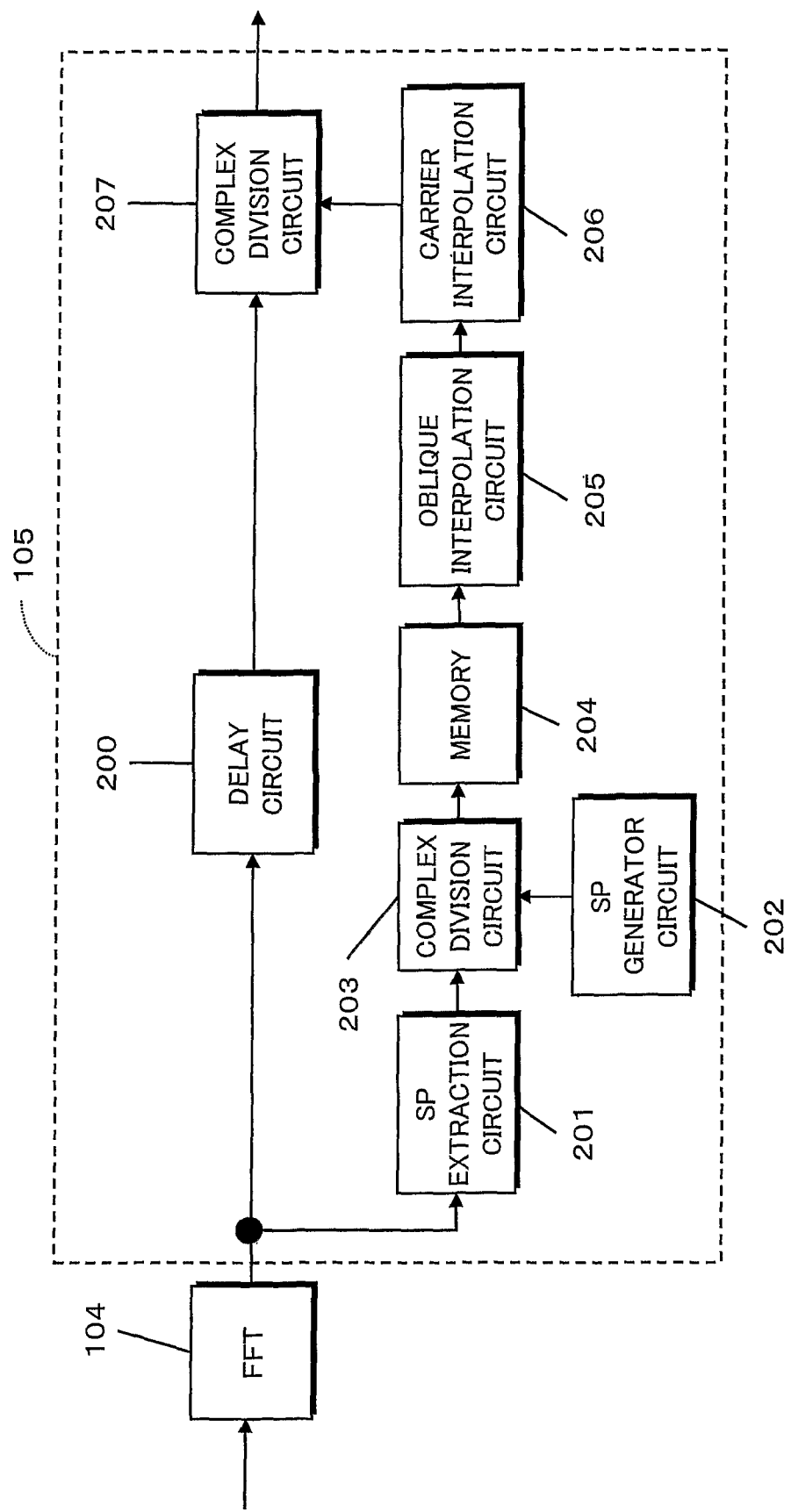
FIG. 2 is a block diagram showing structures of an FFT circuit and an equalizing circuit of FIG. 1.

The following describes the structures of the FFT circuit 104 and the equalizing circuit 105 shown in FIG. 1, with reference to FIG. 2. FIG. 2 is a block diagram showing the structure of the FFT circuit 104 and the structure of the equalizing circuit 105, which is positioned next to the FFT circuit 104.

The equalizing circuit 105 includes a delay circuit 200, an SP extraction circuit 201, an SP generator circuit 202, a complex division circuit 203, a memory 204, an oblique interpolation circuit 205, a carrier interpolation circuit 206 and a complex division circuit 207.

The delay circuit 200 delays the input from the FFT circuit 104 and outputs the delayed signal to the complex division circuit 207 so that the channel characteristics used in the complex division of an information transmission signal and so on become the channel characteristics of the information transmission signal position.

The SP extraction circuit 201 extracts SP signals from the signal resultant from the Fast Fourier Transform performed by the FFT circuit 104, and outputs the extracted SP signals to the complex division circuit 203. The SP generator circuit 202 holds, in accordance with the sub-carrier positions, signals having the same amplitude and phase as the SP signal at the time of the transmission by the transmitter, and provides the complex division circuit 203 with the signals.

The complex division circuit 203 performs complex division on the SP signals received from the SP extraction circuit 201, using a signal corresponding to the sub carrier position of the SP signal provided by the SP generator circuit 202, to adjust the phases of the SP signals BPSK-modulated by the transmitter. The channel characteristics at each SP signal position is derived by this processing.

The memory 204 stores SP signals whose phases are adjusted by the complex division circuit 203. In other words, the memory 204 stores the channel characteristics at each SP signal position.

Figure 3:
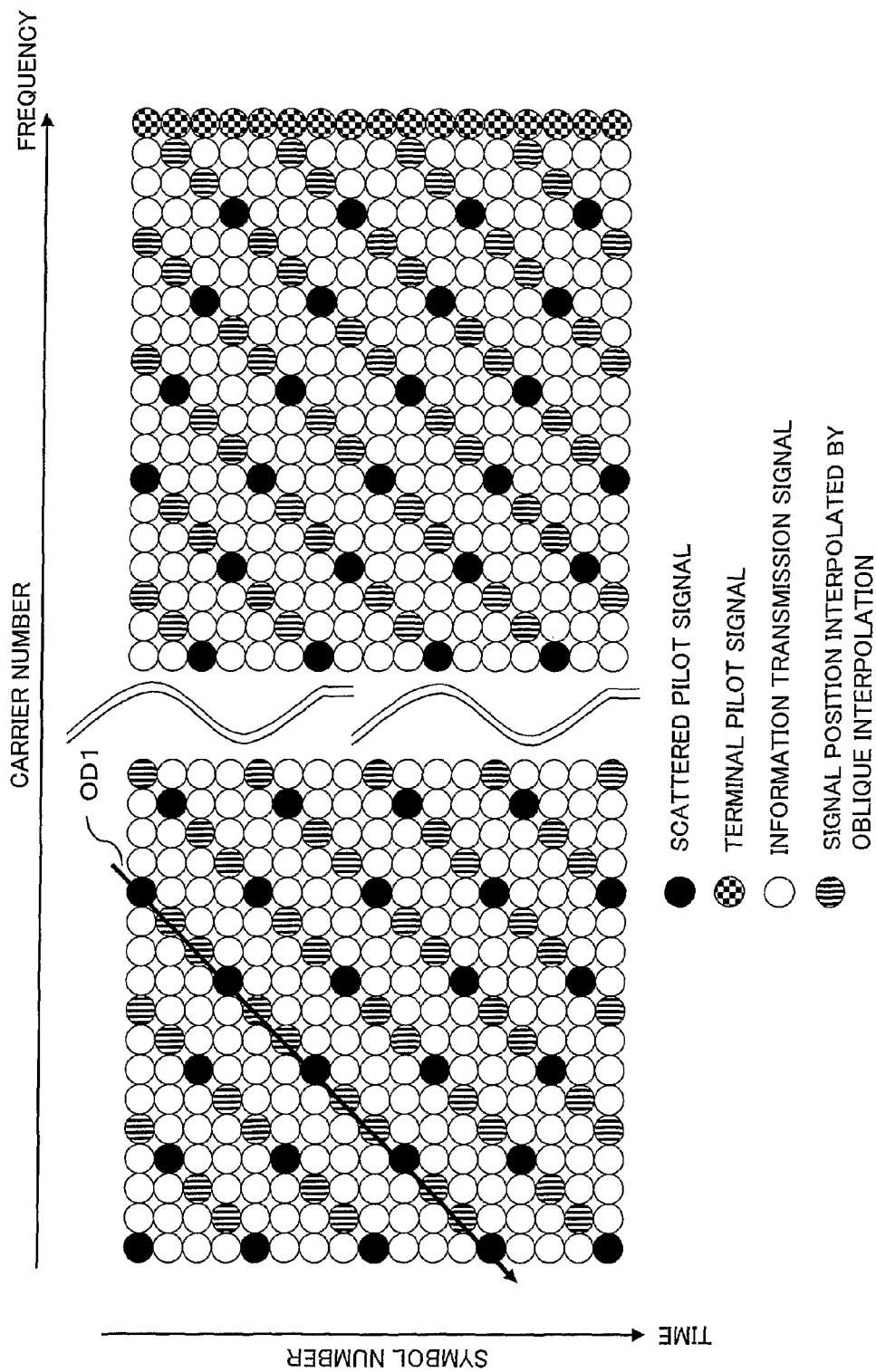
FIG. 3 is a diagram for explaining oblique interpolation processing performed by an oblique interpolation circuit of FIG. 2.

The oblique interpolation circuit 205 performs the interpolation processing of the channel characteristics in an oblique direction, by which the symbol number increases by one in the time axis direction and the carrier number decreases by one in the frequency axis direction with respect to the position where the SP signal exists. This processing is explained next with reference to FIG. 3. FIG. 3 is a drawing for explaining the oblique interpolation processing performed by the oblique interpolation circuit 205 in FIG. 2.

The oblique interpolation circuit 205 interpolates the channel characteristics of the signal positions except for the SP signal positions, using the channel characteristics of the SP signal positions at upper-right of the respective signal positions. This is performed in such a direction that the symbol number increases by one in the time axis direction and the carrier number decreases by one in the frequency axis direction (the direction indicated by a sign OD1 in FIG. 3). This processing is performed on each SP signal, and accordingly the channel characteristics of the positions shown in FIG. 3 are interpolated. As a result, the channel characteristics are obtained by one of every four sub-carriers that are arranged in the frequency direction and have the same symbol number.

In this embodiment, the oblique interpolation is achieved by filtering performed in the above-described oblique direction, using a 31-tap FIR (Finite Impulse Response) filter, for instance.

The carrier interpolation circuit 206 performs the frequency axis interpolation. The carrier interpolation circuit 206 interpolates the channel characteristics of the signal positions that are arranged in the frequency axis direction (i.e. the signal positions having the same symbol number) and whose channel characteristics have not been obtained, using the already obtained channel characteristics. As a result, the channel characteristics of all the sub-carriers are obtained.

In this embodiment, the frequency axis interpolation is achieved by filtering performed in the frequency axis direction, using a 31-tap FIR filter, for instance.

At terminal positions where only less than the predetermined numbers of taps are available, the interpolation is performed by extending the channel characteristics of the terminal positions.

The complex division circuit 207 performs the complex division on the information transmission signals and soon, which are resultant from the Fast Fourier Transform performed by the FFT circuit 104 and input from the delay circuit 200, using the channel characteristics of the positions of the above-described information transmission signals and soon, which are input from a carrier interpolation circuit 206. Then, the complex division circuit 207 outputs, as equalized signals, the signals resultant from the complex division, to the frequency deinterleaver circuit 106 at the subsequent stage.

<Processing Operations by FFT Circuit and Equalizing Circuit>

The following describes processing operations performed by the FFT circuit 104 and the equalizing circuit 105, with reference to FIG. 2.

The signal resultant from the Fast Fourier Transform performed by the FFT circuit 104 is output from the FFT circuit 104 to the delay circuit 200 and the SP extraction circuit 201.

The SP extraction circuit 201 extracts SP signals from the signal resultant from the Fast Fourier Transform, and outputs the extracted SP signals to the complex division circuit 203. At this moment, the SP generator circuit 202 provides the complex division circuit 203 with SP signals that are the same as the SP signals at the time of transmission by the transmitter. The complex division circuit 203 performs the complex division on the SP signals input from the SP extraction circuit 201, using the signals provided by the SP generator circuit 202, to calculate the channel characteristics of each SP signal position. The memory 204 stores the channel characteristics of each SP signal position. Once a predetermined number of groups of channel characteristics are stored in the memory 204, the oblique interpolation circuit 205 performs the above-described oblique interpolation, and then, the carrier interpolation circuit 206 performs the frequency axis interpolation.

The information transmission signals and soon, which are output from the FFT circuit 104, are delayed by the delay circuit 200, and input to the complex division circuit 207. The complex division circuit 207 performs the complex division on the information transmission signals and so on, using the channel characteristics of each information transmission signal position, and transmits the resultant signals to the frequency deinterleaver circuit 106 at the next stage.

<Reception Performance>

In the conventional time axis interpolation processing, the SP signal appears once in every four symbols. In contrast, in the interpolation processing according to this embodiment, which is performed in the oblique direction, the SP signal appears once in every three symbols.

Accordingly, the sampling rate in the time axis direction is fs/3, where fs is the sampling frequency in the time axis direction. As a result, according to the sampling theorem, the receiver 1 according to this embodiment can manage the Doppler frequency up to fs/6. As described above, the receiver 1 according to this embodiment can manage a higher Doppler frequency compared to the conventional receiver which can only manage a Doppler frequency at fs/8 at a maximum.

For instance, in the case where the parameter for the guard interval is ⅛ in the mode 3 of the ISDB-T system, the effective symbol length is 1008 µs, the guard interval length is 126 µs and the symbol length is 1134 µs. Since the sampling frequency fs is an inverse of the symbol length, fs is 881 Hz (=1/1134 µs). Accordingly, the Doppler frequency up to 146 Hz (=881 Hz/6) can be equalized in principle, if leaving ICI (Inter-Carrier Interference) and the like out of consideration. Note that if the oblique interpolation is performed, this means that the interpolation is performed in the frequency direction as well. In this case, the interpolation is performed on one of every three carriers.

In this embodiment, the interpolation is performed in the frequency axis direction on one of every four sub-carriers after the oblique interpolation processing is performed, and if a delayed wave whose length is up to ¼ of the effective symbol length exists, the receiver 1 is capable of equalizing the delayed wave. In both the ISDB-T system and the DVB-T system, the guard interval length is ¼ of the effective symbol length at maximum. Therefore, there is no problem in performing the interpolation according to this embodiment.

Since the interpolation is performed using the SP signal which appears once in every four sub-carriers arranged in the frequency axis direction, the delayed wave whose wave length is ⅛ of the effective symbol length 1008 µs (i.e. ±126 µs) can be managed. Practically, the maximum delay time of the delayed wave that can be equalized is 256 µs with respect to the principal wave. This is the same value as the maximum guard interval length 256 µs defined by standards, and there is no problem.

In the case of using an FIR filter having the same number of taps used for the oblique interpolation processing according to this embodiment and the conventional time axis interpolation processing, the number of the SP signals manageable in the oblique interpolation processing is 4/3 times greater than the number of the SP signals manageable in the time axis interpolation, and the interpolation accuracy is improved.

Also, in the case where the number of the taps of the FIR filter used for the oblique interpolation processing is the ¾ of the number of the taps of the FIR filter used in the conventional time axis interpolation, the number of the SP signals manageable in the oblique interpolation processing is the same as the number of the SP signals manageable in the time axis interpolation. Accordingly, the oblique interpolation in this case is capable of achieving the interpolation accuracy at the same level as the time axis interpolation. Therefore, in the case of achieving the interpolation accuracy at the same level as the time axis interpolation by the oblique interpolation, the amount of memory usage can be reduced.

The Second Embodiment

The following describes the second embodiment of the present invention, with reference to the drawings. Note that the second embodiment performs oblique interpolation processing that is different from the oblique interpolation processing performed by the equalizing circuit 105 in the first embodiment. The same reference sign is used for indicating the constituent having the same function as that in the first embodiment, and its explanation is omitted because the explanation in the first embodiment is applicable.

<Structure of Receiver>

Figure 4:
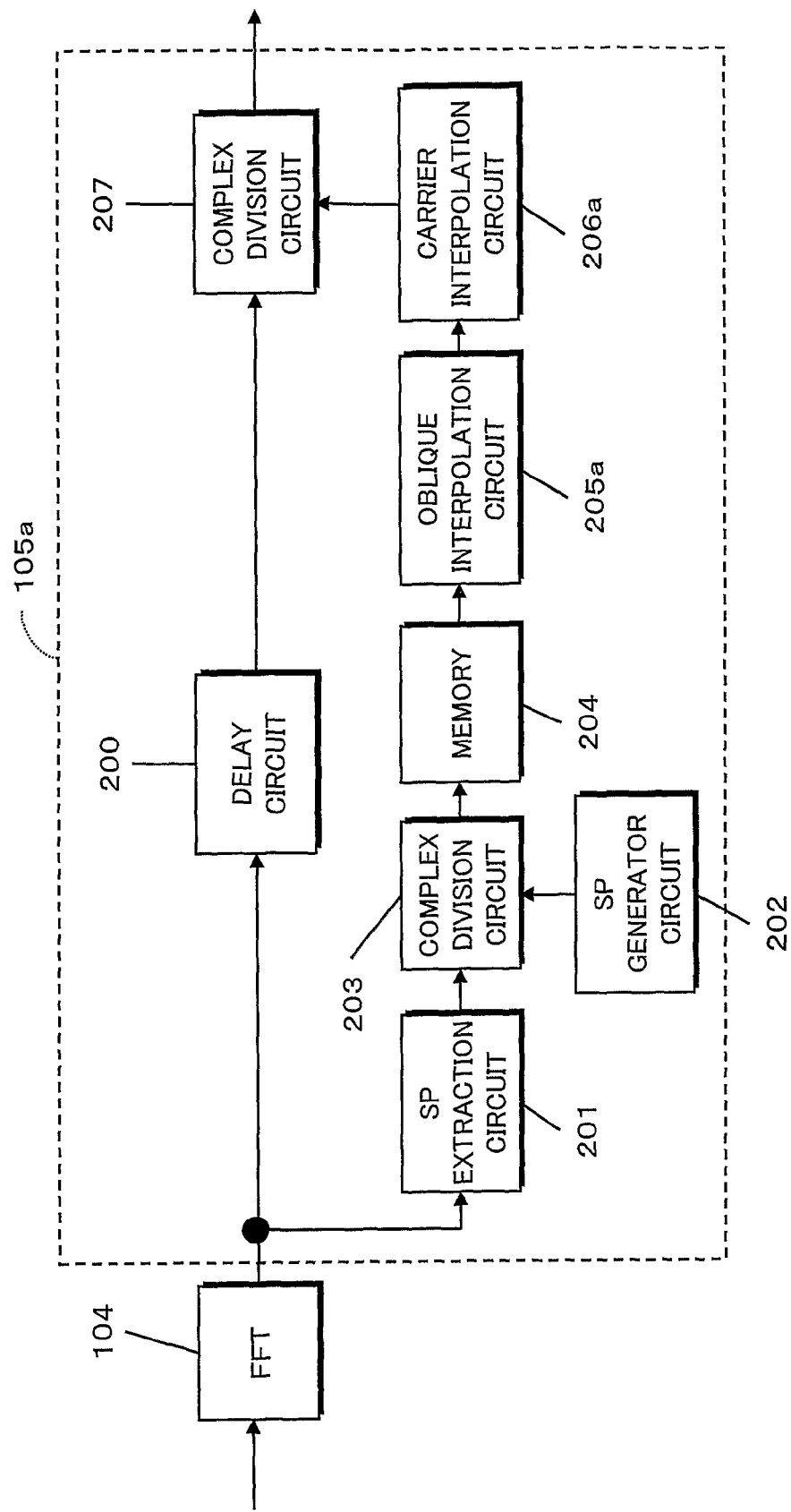
FIG. 4 is a block diagram showing a structure of a receiver according to the second embodiment.

The following describes the structure of the receiver according to the second embodiment, with reference to FIG. 4. FIG. 4 is a block diagram showing the structure of the receiver according to the second embodiment. FIG. 4 shows an FFT circuit 104 arranged next to the quadrature demodulator circuit 103 shown in FIG. 1, and an equalizing circuit 105a arranged next to the FFT circuit 104. A frequency deinterleaver circuit 106 is arranged next to the equalizing circuit 105a.

The equalizing circuit 105a includes a delay circuit 200, an SP extraction circuit 201, an SP generator circuit 202, a complex division circuit 203, a memory 204, an oblique interpolation circuit 205a, a carrier interpolation circuit 206a and a complex division circuit 207.

Figure 5:
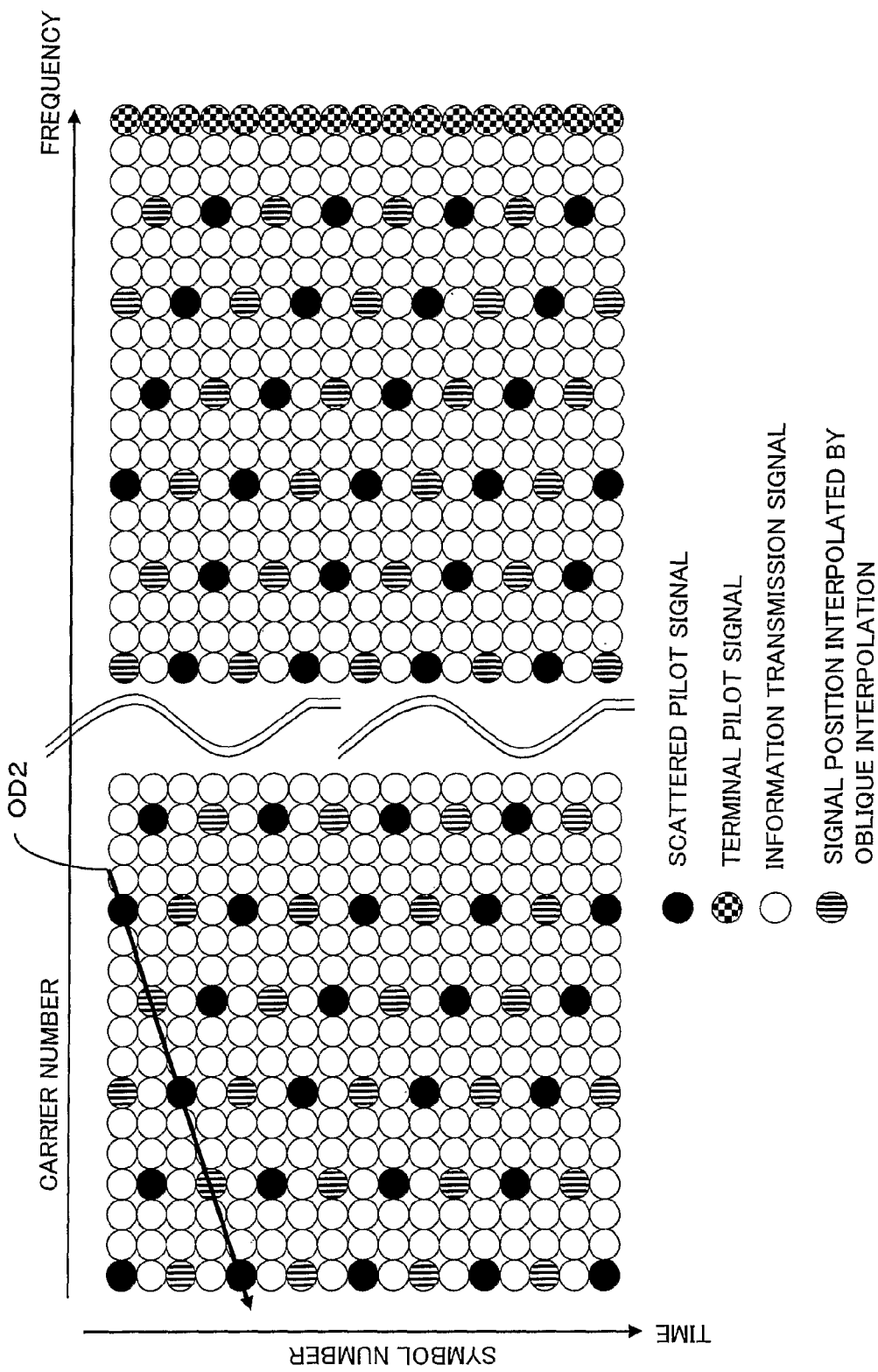
FIG. 5 is a diagram for explaining oblique interpolation processing performed by an oblique interpolation circuit of FIG. 4.

The oblique interpolation circuit 205a performs the interpolation of the channel characteristics in an oblique direction, by which the symbol number increases by one in the time axis direction and the carrier number decreases by three in the frequency axis direction with reference to the position where the SP signal exists. This processing is explained next with reference to FIG. 5. FIG. 5 is a drawing for explaining the oblique interpolation processing performed by the oblique interpolation circuit 205a in FIG. 4.

The oblique interpolation circuit 205a interpolates the channel characteristics of the signal positions except for the SP signal positions, using the channel characteristics of the SP signals at upper-right of the respective signals. This is performed in such a direction that the symbol number increases by one in the time axis direction and the carrier number decreases by three in the frequency axis direction (the direction indicated by a sign OD2 in FIG. 5). This processing is performed on each SP signal, and accordingly the channel characteristics of the signal positions shown in FIG. 5 are interpolated. At these positions, $k=3((n+2) \bmod 4)+12p$ is satisfied, where n is a symbol number, k is a carrier number and p is an integer that is equal to or greater than 0. As a result, the channel characteristics are obtained by one of every six sub-carriers that are arranged in the frequency direction and have the same symbol number.

In this embodiment, the oblique interpolation is achieved by filtering performed in the above-described oblique direction, using a 31-tap FIR filter, for instance.

The carrier interpolation circuit 206a performs the frequency axis interpolation. The carrier interpolation circuit 206a interpolates the channel characteristics of the signal positions that are arranged in the frequency axis direction (i.e. the signal positions having the same symbol number) and whose channel characteristics have not been obtained, using the already obtained channel characteristics. As a result, the channel characteristics of all the sub-carriers are obtained.

In this embodiment, the frequency axis interpolation is achieved by filtering performed in the frequency axis direction, using a 31-tap FIR filter, for instance.

<Processing Operations by Receiver>

The following describes processing operations performed by the receiver, with reference to FIG. 4.

The signal resultant from the Fast Fourier Transform performed by the FFT circuit 104 is output from the FFT circuit 104 to the delay circuit 200 and the SP extraction circuit 201.

The SP extraction circuit 201 extracts SP signals from the signal resultant from the Fast Fourier Transform, and outputs the extracted SP signals to the complex division circuit 203. At this moment, the SP generator circuit 202 provides the complex division circuit 203 with SP signals that are the same as the SP signals at the time of transmission by the transmitter. The complex division circuit 203 performs the complex division on the SP signals input from the SP extraction circuit 201, using the signals provided by the SP generator circuit 202, to calculate the channel characteristics of each SP signal position. The memory 204 stores the channel characteristics of each SP signal position. Once a predetermined number of groups of channel characteristics are stored in the memory 204, the oblique interpolation circuit 205a performs the above-described oblique interpolation, and then, the carrier interpolation circuit 206a performs the above-described frequency axis interpolation.

The information transmission signals and soon, which are output from the FFT circuit 104, are delayed by the delay circuit 200, and input to the complex division circuit 207. The complex division circuit 207 performs the complex division on the information transmission signals, using the channel characteristics of each information transmission signal position, and transmits the resultant signals to the frequency deinterleaver circuit 106 at the next stage.

<Reception Performance>

In the conventional time axis interpolation processing, the SP signal appears once in every four symbols. In contrast, in the interpolation processing according to this embodiment, which is performed in the oblique direction, the SP signal appears once in every two symbols.

Accordingly, the sampling rate in the time axis direction is fs/2, where fs is the sampling frequency in the time axis direction. As a result, according to the sampling theorem, the receiver according to this embodiment can manage the Doppler frequency up to fs/4. As described above, the receiver 1 according to this embodiment can manage a higher Doppler frequency compared to the conventional receiver which can only manage a Doppler frequency at fs/8 at a maximum.

For instance, in the case where the parameter for the guard interval is ⅛ in the mode 3 of the ISDB-T system, the effective symbol length is 1008 µs, the guard interval length is 126 µs and the symbol length is 1134 µs. Since the sampling frequency fs is an inverse of the symbol length, fs is 881 Hz ($=\frac{1}{1134}$ µs). Accordingly, the Doppler frequency up to 220 Hz (=881 Hz/4) can be equalized in principle, if leaving ICI and the like out of consideration.

Although the SP signal appears once in every two symbols in the oblique interpolation processing, the frequency axis interpolation is performed using the SP signal which appears once in every six sub-carriers. Accordingly, the delayed wave whose wave length is 1/12 of the effective symbol length 1008 µs (i.e. ±84 µs) can be managed. Practically, the maximum delay time of the delayed wave that can be equalized is 168 µs with respect to the principal wave.

If this is the case, if the transmission is performed with a guard interval length that is ⅛ of the effective symbol length, there is no problem because the delayed wave delayed for up to 126 µs with respect to the principal wave is within the scope of the assumption. However, if the transmission is performed with a guard interval length that is ¼ of the effective symbol length, if a multipath which is delayed for more than 168 µs occurs, it is difficult to equalize the multipath, because the delayed wave delayed for only up to 256 µs with respect to the principal wave is within the scope of the assumption.

<Simulation Result>

Figure 6:
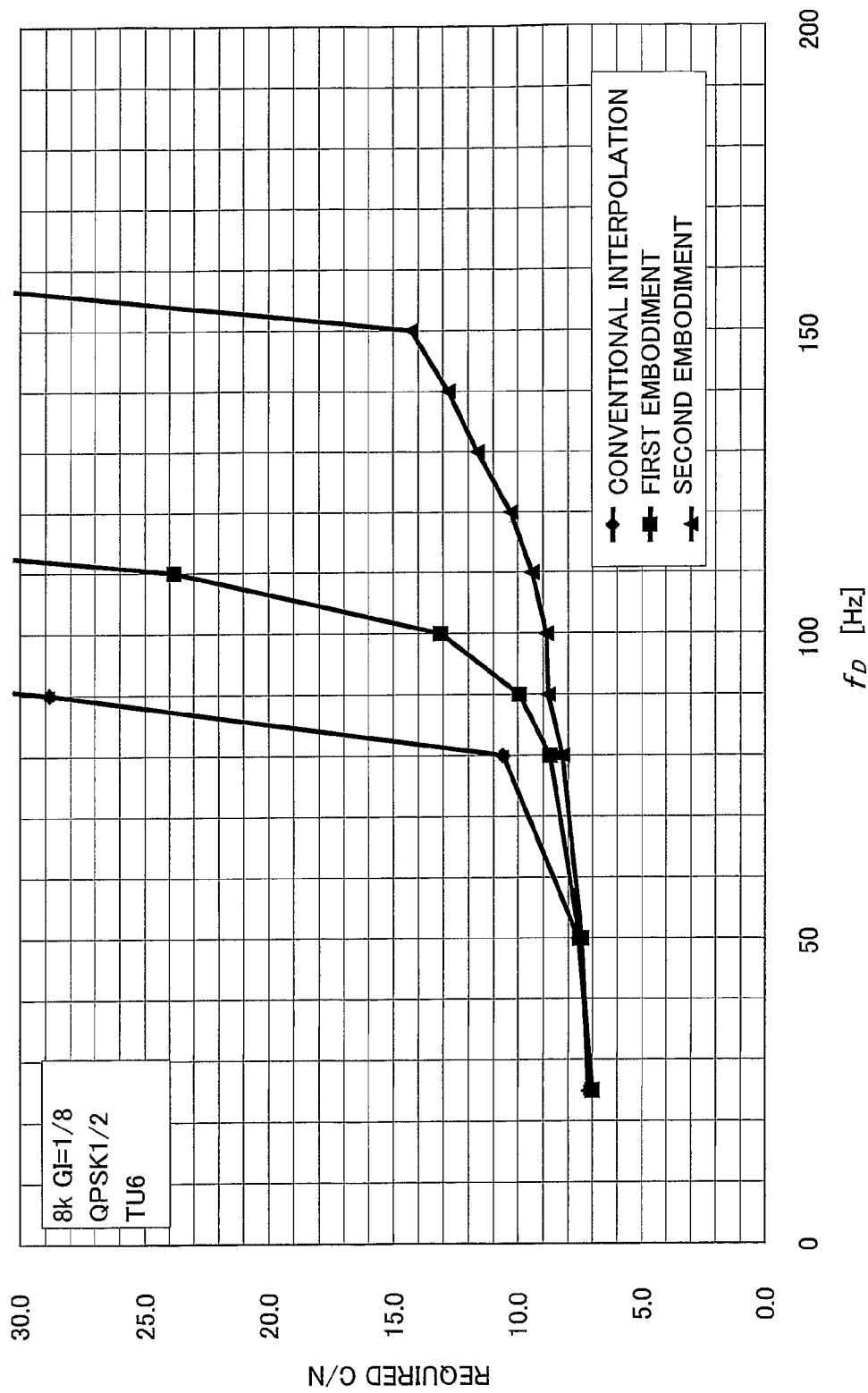
FIG. 6 shows a simulation result of interpolation processing according to the first embodiment, the second embodiment and a conventional technique, which was performed in a fading environment.

The following describes a simulation result of the interpolation processing according to the first embodiment, the second embodiment and the conventional technique, which was performed in a fading environment, with reference to FIG. 6. FIG. 6 shows the simulation result of the interpolation processing according to the first embodiment, the second embodiment and the conventional technique, which was performed in the fading environment. In FIG. 6, the horizontal axis indicates a maximum Doppler frequency, and the vertical axis indicates a required CN (Carrier to Noise) ratio.

The simulation was performed in a fading environment in which: a transmission path called TU6, used in GSM (Global System for Mobile Communications) and the like, is used;

Mode 3 (FFT size is 8 k) is set to the OFDM parameter; the guard interval length is ⅛ of the effective symbol length; and the QPSK code rate is 2/1.

As FIG. 6 shows, although the theoretical limitation by the sampling is not achieved, the mobile reception performance increases in order of the conventional technique, the first embodiment, and the second embodiment.

The Third Embodiment

The following describes the third embodiment of the present invention, with reference to the drawings. Note that the third embodiment performs the time axis interpolation processing after performing the oblique interpolation processing of the second embodiment. The same reference sign is used for indicating the constituent having the same function as that in the above-described embodiments, and its explanation is omitted because the explanations in the above-described embodiments are applicable.

<Structure of Receiver>

Figure 7:
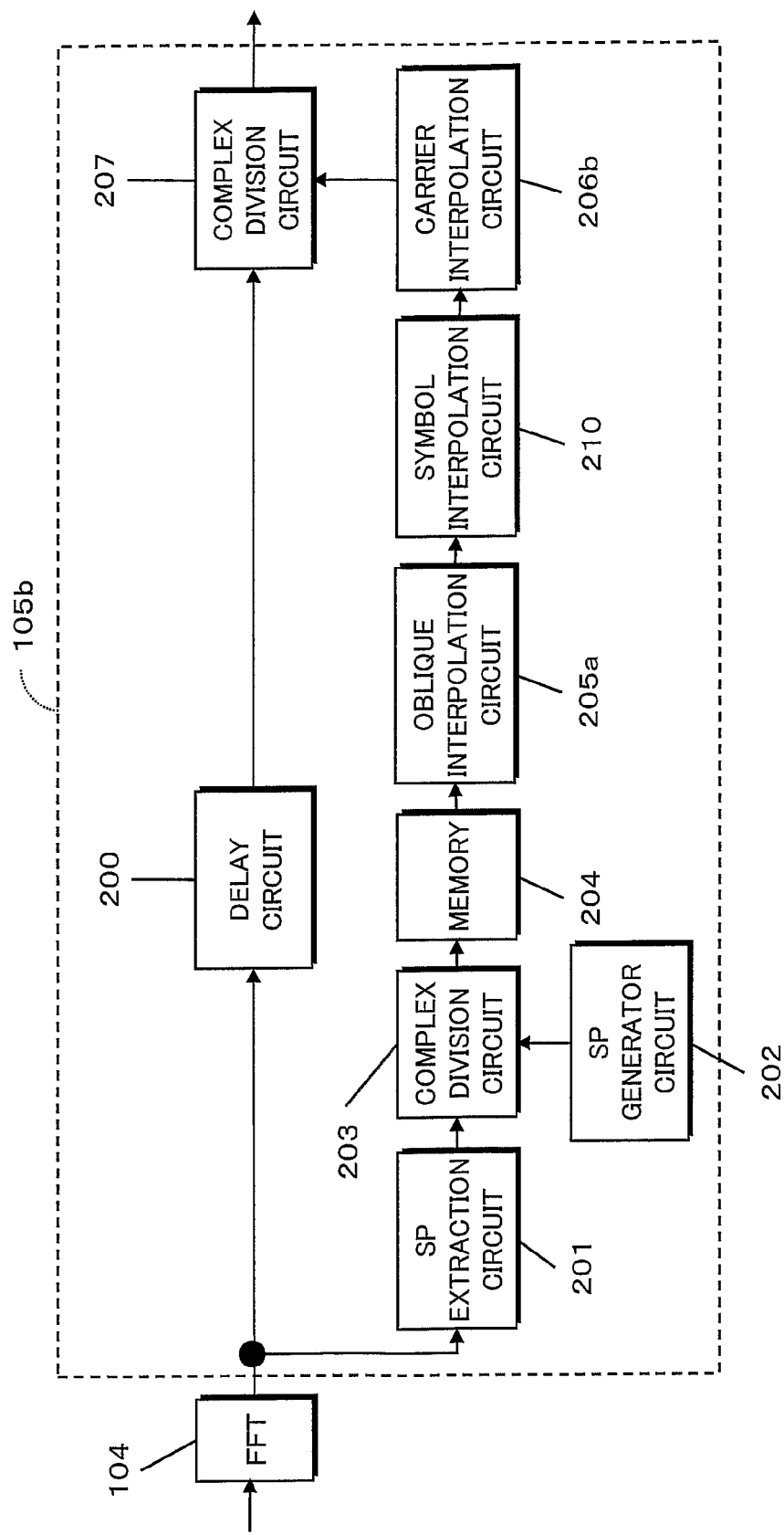
FIG. 7 is a block diagram showing a structure of a receiver according to the third embodiment.

The following describes the structure of the receiver according to the third embodiment, with reference to FIG. 7. FIG. 7 is a block diagram showing the structure of the receiver according to the third embodiment. FIG. 7 shows an FFT circuit 104 arranged next to the quadrature demodulator circuit 103 shown in FIG. 1, and an equalizing circuit 105b arranged next to the FFT circuit 104. A frequency deinterleaver circuit 106 is arranged next to the equalizing circuit 105b.

The equalizing circuit 105b includes a delay circuit 200, an SP extraction circuit 201, an SP generator circuit 202, a complex division circuit 203, a memory 204, an oblique interpolation circuit 205a, a symbol interpolation circuit 210, a carrier interpolation circuit 206b and a complex division circuit 207.

The symbol interpolation circuit 210 performs the time axis interpolation. The symbol interpolation circuit 210 interpolates the channel characteristics of the signal positions that are arranged in the time axis direction (i.e. the signal positions having the same carrier number) and whose channel characteristics have not been obtained, using the already obtained channel characteristics. This is performed for each sub-carrier that carries the SP signal.

In this embodiment, the time axis interpolation is achieved by filtering performed in the time axis direction, using a 31-tap FIR filter, for instance.

The carrier interpolation circuit 206b performs the frequency axis interpolation. The carrier interpolation circuit 206b interpolates the channel characteristics of the signal positions that are arranged in the frequency axis direction (i.e. the signal positions having the same symbol number) and whose channel characteristics have not been obtained, using the already obtained channel characteristics. As a result, the channel characteristics of all the sub-carriers are obtained.

In this embodiment, the frequency axis interpolation is achieved by filtering performed in the frequency axis direction, using a 31-tap FIR filter, for instance.

<Interpolation Processing>

Figure 8:
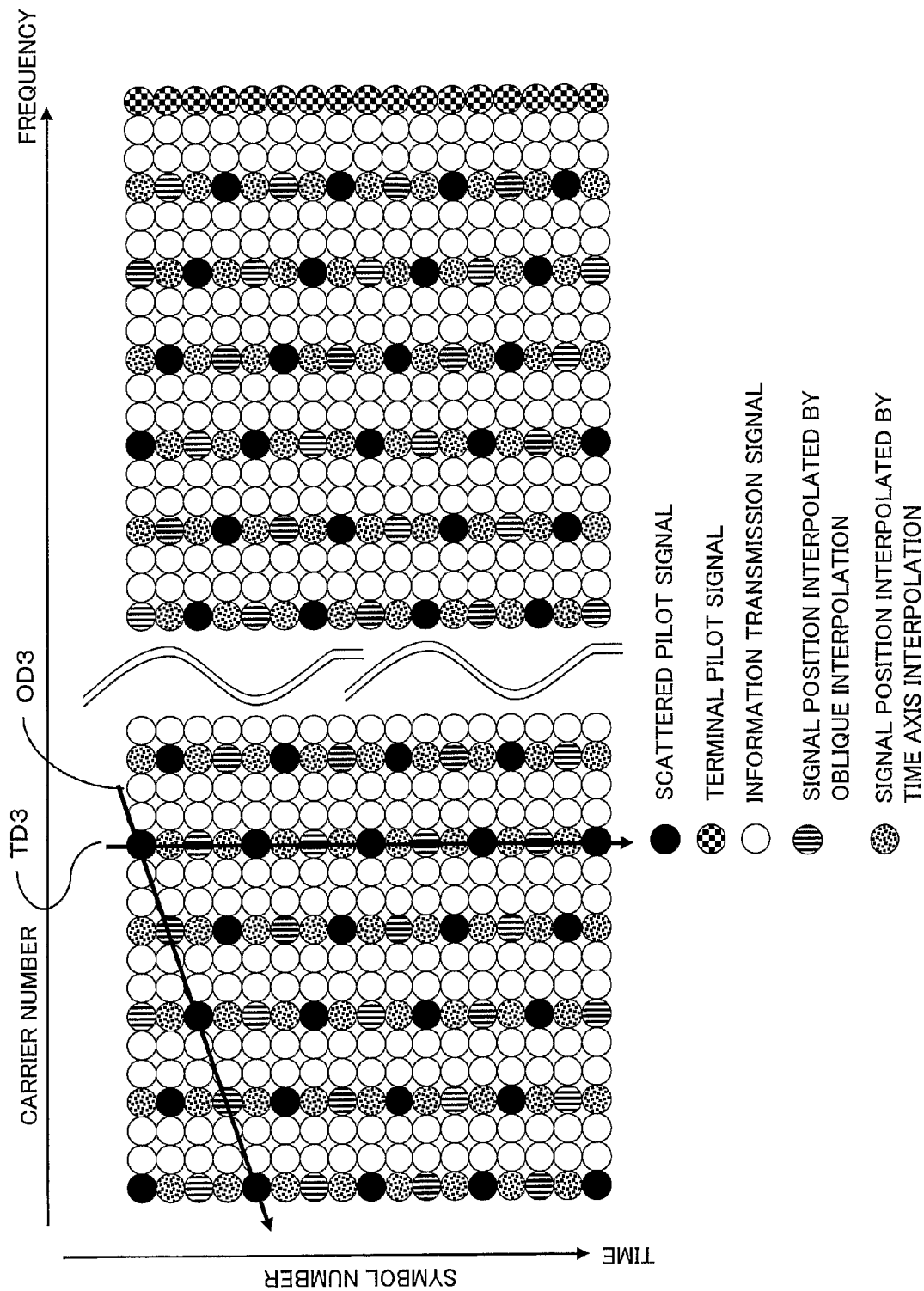
FIG. 8 is a drawing for explaining interpolation processing performed by an equalizing circuit of FIG. 7.

The following describes the interpolation processing performed by the equalizing circuit 105b of FIG. 7, with reference to FIG. 8. FIG. 8 is a drawing for explaining the interpolation processing performed by the equalizing circuit 105b of FIG. 7.

The oblique interpolation circuit 205b interpolates the channel characteristics of the signal positions except for the SP signal positions, using the channel characteristics of the SP signal positions at upper-right of the respective signal positions. This is performed in such a direction that the symbol number increases by one in the time axis direction and the carrier number decreases by three in the frequency axis direction with respect to the SP signal (the direction indicated by a sign OD3 in FIG. 8). This processing is performed on each SP signal, and accordingly the channel characteristics of the signal positions shown in FIG. 5 are interpolated. At these positions, k=3((n+2)mod4)+12p is satisfied, where n is a symbol number, k is a carrier number and p is an integer that is equal to or greater than 0.

Next, the symbol interpolation circuit 210 performs the time axis interpolation. The carrier interpolation circuit 206a interpolates the channel characteristics of the signal positions that are arranged in the time axis direction (i.e. the signal positions having the same carrier number, and arranged in the direction represented by the sign TD3 in FIG. 8.) and whose channel characteristics have not been obtained, using the already obtained channel characteristics. This is performed for each sub-carrier that carries the SP signal, and the channel characteristics are interpolated to each position shown in FIG. 8.

Finally, the carrier interpolation circuit 206b performs the frequency axis interpolation. The carrier interpolation circuit 206b interpolates the channel characteristics of the signal positions that are arranged in the frequency axis direction (i.e. the signal positions having the same symbol number) and whose channel characteristics have not been obtained, using the already obtained channel characteristics.

<Processing Operations by Receiver>

The following describes the processing operations performed by the receiver, with reference to FIG. 7.

The signal resultant from the Fast Fourier Transform performed by the FFT circuit 104 is output from the FFT circuit 104 to the delay circuit 200 and the SP extraction circuit 201.

The SP extraction circuit 201 extracts SP signals from the signal resultant from the Fast Fourier Transform, and outputs the extracted SP signals to the complex division circuit 203. At this moment, the SP generator circuit 202 provides the complex division circuit 203 with SP signals that are the same as the SP signals at the time of transmission by the transmitter. The complex division circuit 203 performs the complex division on the SP signals input from the SP extraction circuit 201, using the signals provided by the SP generator circuit 202, to calculate the channel characteristics of each SP signal position. The memory 204 stores the channel characteristics of each SP signal position. Once a predetermined number of groups of channel characteristics are stored in the memory 204, the oblique interpolation circuit 205a performs the above-described oblique interpolation, and next, the symbol interpolation circuit 210 performs the above-described time axis interpolation. Then, the carrier interpolation circuit 206b performs the above-described frequency axis interpolation.

The information transmission signals and soon, which are output from the FFT circuit 104, are delayed by the delay circuit 200, and input to the complex division circuit 207. The complex division circuit 207 performs the complex division on the information transmission signals, using the channel characteristics of each information transmission signal position, and transmits the resultant signals to the frequency deinterleaver circuit 106 at the next stage.

<Reception Performance>

In the conventional time axis interpolation processing, the SP signal appears once in every four symbols. In contrast, in the interpolation processing according to this embodiment, which is performed in the oblique direction, the SP signal appears once in every two symbols.

Accordingly, the sampling rate in the time axis direction is fs/2, where fs is the sampling frequency in the time axis direction, because, in this embodiment, the SP signal appears once in every two symbols. As a result, according to the sampling theorem, the receiver according to this embodiment can manage the Doppler frequency up to fs/4. As described above, the receiver 1 according to this embodiment can manage a higher Doppler frequency compared to the conventional receiver which can only manage a Doppler frequency at fs/8 at a maximum.

The Fourth Embodiment

The following describes the fourth embodiment of the present invention, with reference to the drawings. Note that in contrast to the first embodiment that performs the oblique interpolation processing and the frequency axis interpolation processing, the fourth embodiment performs only the frequency axis interpolation. The same reference sign is used for indicating the constituent having the same function as that in the above-described embodiments, and its explanation is omitted because the explanations in the above-described embodiments are applicable.
<Structure of Receiver>

Figure 9:
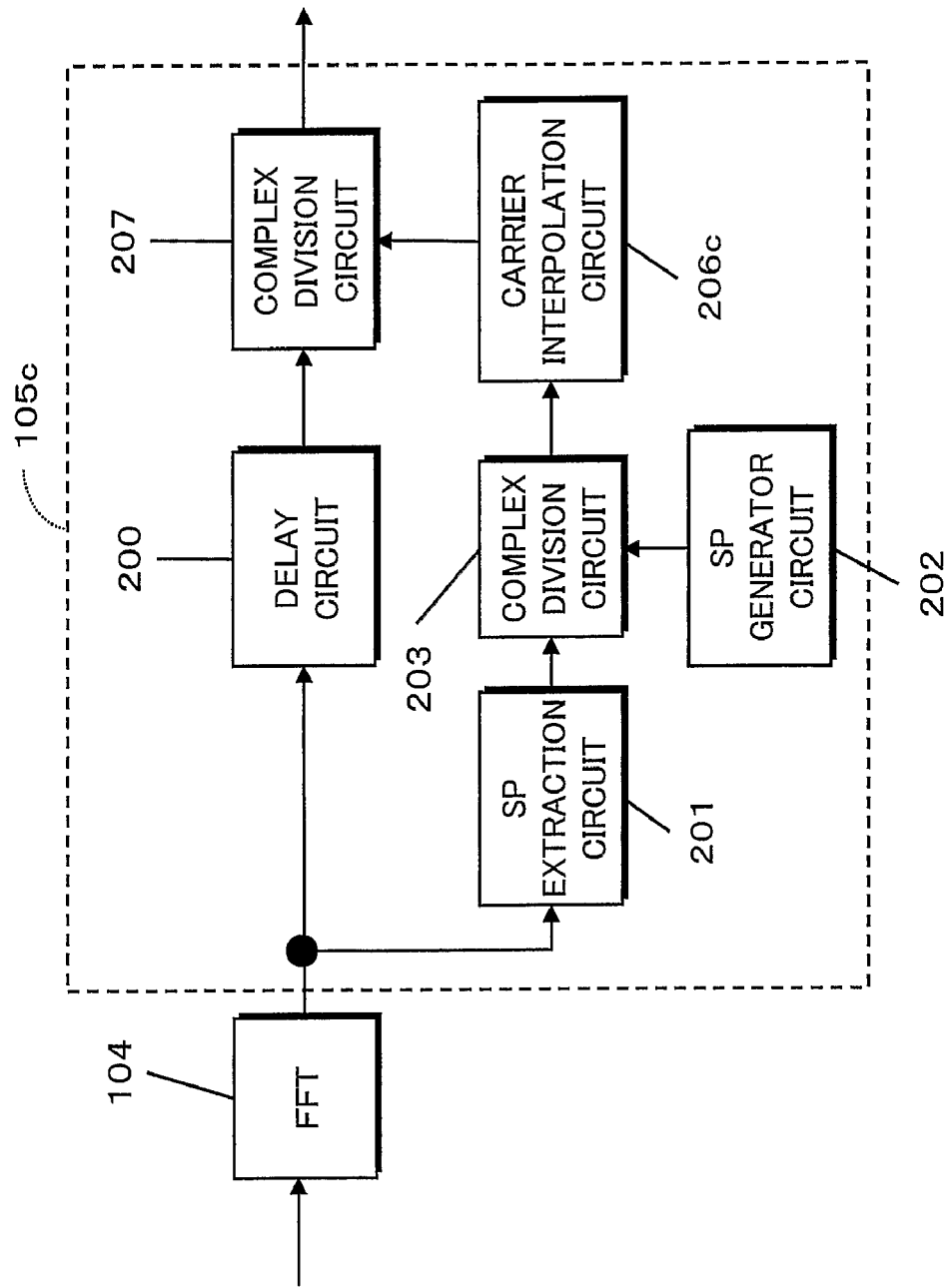
FIG. 9 is a block diagram showing a structure of a receiver according to the fourth embodiment.

The following describes the structure of the receiver according to the fourth embodiment, with reference to FIG. 9. FIG. 9 is a block diagram showing the structure of the receiver according to the fourth embodiment. FIG. 9 shows an FFT circuit 104 arranged next to the quadrature demodulator circuit 103 shown in FIG. 1, and an equalizing circuit 105c arranged next to the FFT circuit 104. A frequency deinterleaver circuit 106 is arranged next to the equalizing circuit 105c.

The equalizing circuit 105c includes a delay circuit 200, an SP extraction circuit 201, an SP generator circuit 202, a complex division circuit 203, a carrier interpolation circuit 206c and a complex division circuit 207.

The carrier interpolation circuit 206c performs the frequency axis interpolation. The carrier interpolation circuit 206c interpolates the channel characteristics of the signal positions that are arranged in the frequency axis direction (i.e. the signal positions having the same symbol number) and whose channel characteristics have not been obtained, using the already obtained channel characteristics. As a result, the channel characteristics of all the sub-carriers are obtained.

In this embodiment, the frequency axis interpolation is achieved by filtering performed in the frequency axis direction, using a 31-tap FIR filter, for instance.
<Processing Operations by Receiver>

The following describes processing operations performed by the receiver, with reference to FIG. 9.

The signal resultant from the Fast Fourier Transform performed by the FFT circuit 104 is output from the FFT circuit 104 to the delay circuit 200 and the SP extraction circuit 201.

The SP extraction circuit 201 extracts SP signals from the signal resultant from the Fast Fourier Transform, and outputs the extracted SP signals to the complex division circuit 203. At this moment, the SP generator circuit 202 provides the complex division circuit 203 with SP signals that are the same as the SP signals at the time of transmission by the transmitter. The complex division circuit 203 performs the complex division on the SP signals input from the SP extraction circuit 201, using the signals provided by the SP generator circuit 202, to calculate the channel characteristics of each SP signal position. The memory 204 stores the channel characteristics of each SP signal. Once a predetermined number of groups of channel characteristics are stored in the memory 204, the carrier interpolation circuit 206c performs the above-described frequency axis interpolation.

The information transmission signals and so on, which are output from the FFT circuit 104, are delayed by the delay circuit 200, and input to the complex division circuit 207. The complex division circuit 207 performs the complex division on the information transmission signals, using the channel characteristics of each information transmission signal position, and transmits the resultant signals to the frequency deinterleaver circuit 106 at the next stage.
<Reception Performance>

In the conventional time axis interpolation processing, the SP signal appears once in every four symbols. In contrast, in the interpolation processing according to this embodiment the SP signal appears in every symbol.

Accordingly, the sampling rate in the time axis direction is fs, where fs is the sampling frequency in the time axis direction. As a result, according to the sampling theorem, the receiver according to this embodiment can manage the Doppler frequency up to fs/2. As described above, the receiver according to this embodiment can manage a higher Doppler frequency compared to the conventional receiver which can only manage a Doppler frequency at fs/8 at a maximum.

For instance, in the case where the parameter for the guard interval is $\frac{1}{8}$ in the mode 3 of the ISDB-T system, the effective symbol length is 1008 μs, the guard interval length is 126 μs and the symbol length is 1134 μs. Since the sampling frequency fs is an inverse of the symbol length, fs is 881 Hz (=$\frac{1}{1134}$ μs). Accordingly, the Doppler frequency up to 440 Hz (=881 Hz/2) can be equalized in principle, if leaving ICI and the like out of consideration.

Since the frequency axis interpolation is performed using the SP signal which appears once in every twelve sub-carriers, the delayed wave whose wave length is $\frac{1}{24}$ of the effective symbol length 1008 μs (i.e. ±42 μs) can be managed. Practically, the maximum delay time of the delayed wave that can be equalized is 84 μs with respect to the principal wave.

If this is the case, if the transmission is performed with a guard interval length that is $\frac{1}{16}$ of the effective symbol length, there is no problem because the delayed wave delayed for up to 63 μs with respect to the principal wave is within the scope of the assumption. However, if the transmission is performed with a guard interval length that is $\frac{1}{8}$ of the effective symbol length, if a multipath which is delayed for more than 84 μs occurs, it is difficult to equalize the multipath, because the delayed wave delayed for only up to 128 μs with respect to the principal wave is within the scope of the assumption.

The Fifth Embodiment

The following describes the fifth embodiment of the present invention, with reference to the drawings. Note that the fifth embodiment includes two routes for the interpolation processing in contrast to the first to fourth embodiments having only one route for the interpolation processing. The same reference sign is used for indicating the same constituent having the same function as that in the above-described embodiments, and its explanation is omitted because the explanations in the above-described embodiments are applicable.
<Structure of Receiver>

Figure 10:
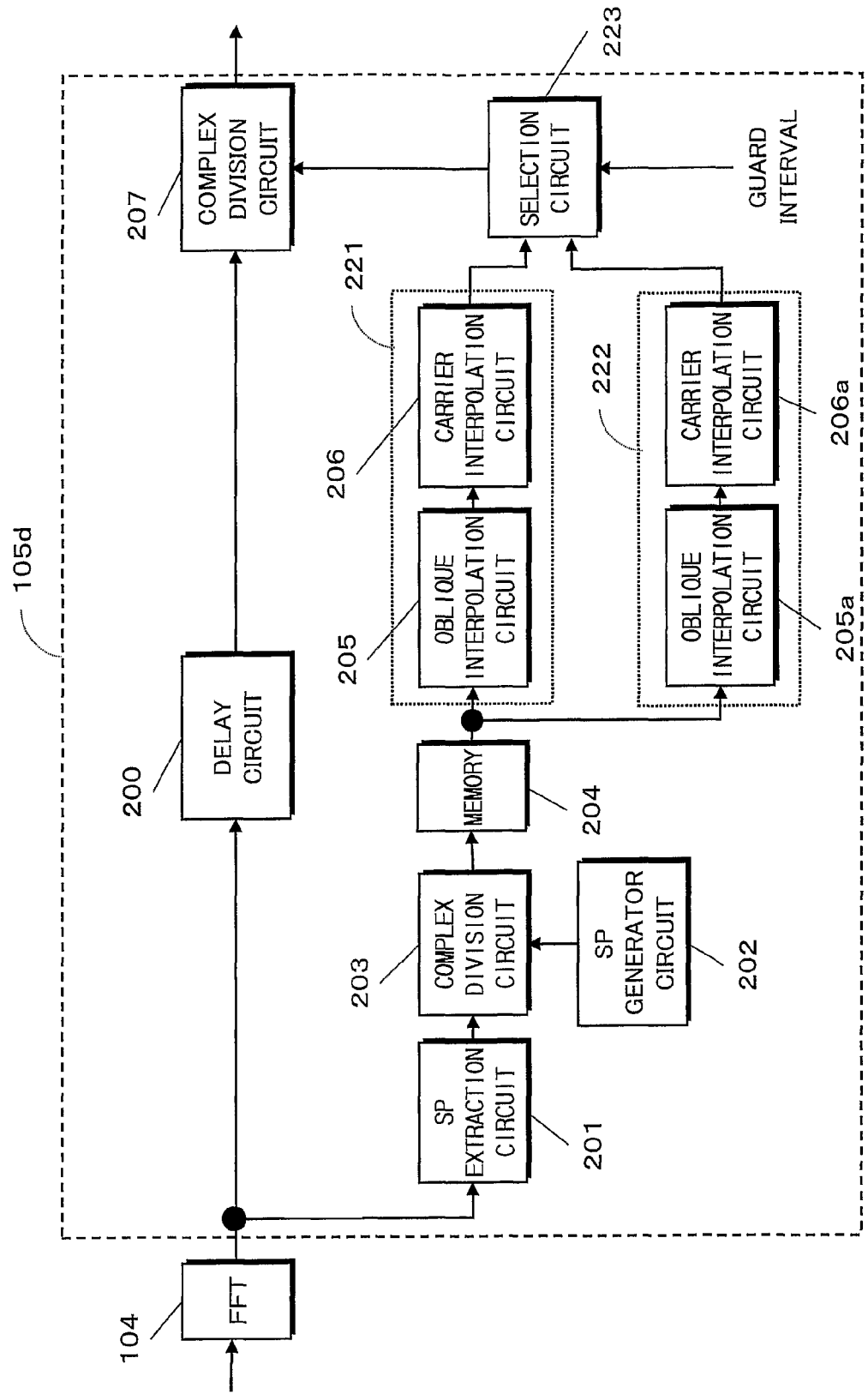
FIG. 10 is a block diagram showing a structure of a receiver according to the fifth embodiment.

The following describes the structure of the receiver according to the fifth embodiment, with reference to FIG. 10. FIG. 10 is a block diagram showing the structure of the receiver according to the fifth embodiment. FIG. 10 shows an FFT circuit 104 arranged next to the quadrature demodulator circuit 103 shown in FIG. 1, and an equalizing circuit 105d arranged next to the FFT circuit 104. A frequency deinterleaver circuit 106 is arranged next to the equalizing circuit 105d.

The equalizing circuit 105d includes a delay circuit 200, an SP extraction circuit 201, an SP generator circuit 202, a complex division circuit 203, a memory 204, an interpolation circuit 221, an interpolation circuit 222, a selection circuit 223 and a complex division circuit 207.

The interpolation circuit 221 interpolates the channel characteristics of the signal positions except for the SP signal positions, using the channel characteristics of the SP signal position calculated by the complex division performed by the complex division circuit 203. The interpolation circuit 221 includes the oblique interpolation circuit 205 and the carrier interpolation circuit 206, which are explained in the first embodiment.

The interpolation circuit 222 interpolates the channel characteristics of the signals except for the SP signals, using the channel characteristics of the SP signal position calculated by the complex division performed by the complex division circuit 203. The interpolation circuit 222 includes the oblique interpolation circuit 205a and the carrier interpolation circuit 206a, which are explained in the second embodiment.

If the parameter for the guard interval is ¼, the selection circuit 223 selects the input from the interpolation circuit 221 between the input from the interpolation circuit 221 and the input from the interpolation circuit 222, and outputs the input from the interpolation circuit 221 to the complex division circuit 207. If the parameter for the guard interval is ⅛ or 1/16 or 1/32, the selection circuit 223 selects the input from the interpolation circuit 222 between the input from the interpolation circuit 221 and the input from the interpolation circuit 222, and outputs the input from the interpolation circuit 222 to the complex division circuit 207.

This selection is performed in the following manner. The selection circuit 223 selects the interpolation circuit that performs the interpolation that can manage the delayed wave that is delayed for a time equal to the product of the effective symbol length and the parameter for the guard interval. In the case where both of the interpolation circuit 221 and the interpolation circuit 222 can manage the delayed wave that is delayed for a time equal to the product of the effective symbol length and the parameter for the guard interval, the selection circuit 223 selects the interpolation circuit that can manage a higher Doppler frequency.

<Processing Operations by Receiver>

The following describes processing operations performed by the receiver, with reference to FIG. 10. In the following explanation, it is assumed that a value ¼ is set to the parameter for the guard interval.

The signal resultant from the Fast Fourier Transform performed by the FFT circuit 104 is output from the FFT circuit 104 to the delay circuit 200 and the SP extraction circuit 201.

The SP extraction circuit 201 extracts SP signals from the signal resultant from the Fast Fourier Transform, and outputs the extracted SP signals to the complex division circuit 203. At this moment, the SP generator circuit 202 provides the complex division circuit 203 with SP signals that are the same as the SP signals at the time of transmission by the transmitter. The complex division circuit 203 performs the complex division on the SP signals input from the SP extraction circuit 201, using the signals provided by the SP generator circuit 202, to calculate the channel characteristics at each SP signal position. The memory 204 stores the channel characteristics of each SP signal position.

Once a predetermined number of groups of channel characteristics are stored in the memory 204, the interpolation circuit 221 performs the oblique interpolation processing and the frequency axis interpolation processing, which are described in the first embodiment, and outputs the interpolation result to the selection circuit 223. Meanwhile, the interpolation circuit 222 performs the oblique interpolation and the frequency axis interpolation, which are described in the second embodiment, and outputs the interpolation result to the selection circuit 223.

Since the parameter for the guard interval is ¼, the selection circuit 223 selects the input from the interpolation circuit 221, and outputs the input to the complex division circuit 207.

The information transmission signals and soon, which are output from the FFT circuit 104, are delayed by the delay circuit 200, and input to the complex division circuit 207. The complex division circuit 207 performs the complex division on the information transmission signals, using the channel characteristics of each information transmission signal position, and transmits the resultant signals to the frequency deinterleaver circuit 106 at the next stage.

In the case where the parameter for the guard interval is ⅛ or 1/16 or 1/32, the selection circuit 223 selects the input from the interpolation circuit 222, and outputs the input to the complex division circuit 207.

The Sixth Embodiment

The following describes the sixth embodiment of the present invention, with reference to the drawings. Note that the sixth embodiment performs the selection of the route for the interpolation processing from the two routes based on a delay profile, in contrast to the fifth embodiment that performs the selection of the route for the interpolation processing from the two routes based on the parameter for the guard interval. The same reference sign is used for indicating the same constituent having the same function as that in the above-described embodiments, and its explanation is omitted because the explanations in the above-described embodiments are applicable.

This embodiment is explained based on the standard of the DVB-H (Digital Video Broadcast—Handheld) system.

The DVB-H system is based on the DVB-T system, and performs transmission for services for portable terminal apparatuses. The DVB-H system performs burst transmission for predetermined services, using the time division multiplexing.

At the front-end of the receiver, only a section that receives the predetermined services can be individually powered on while the other sections are powered off. Accordingly, this method can save the electrical power consumed by the front-end. The span of the burst transmission for the services is approximately 150 ms, and it takes approximately 5 sec before the transmission for the same services is restarted. The power is off during this period.

<Structure of Receiver>

Figure 11:
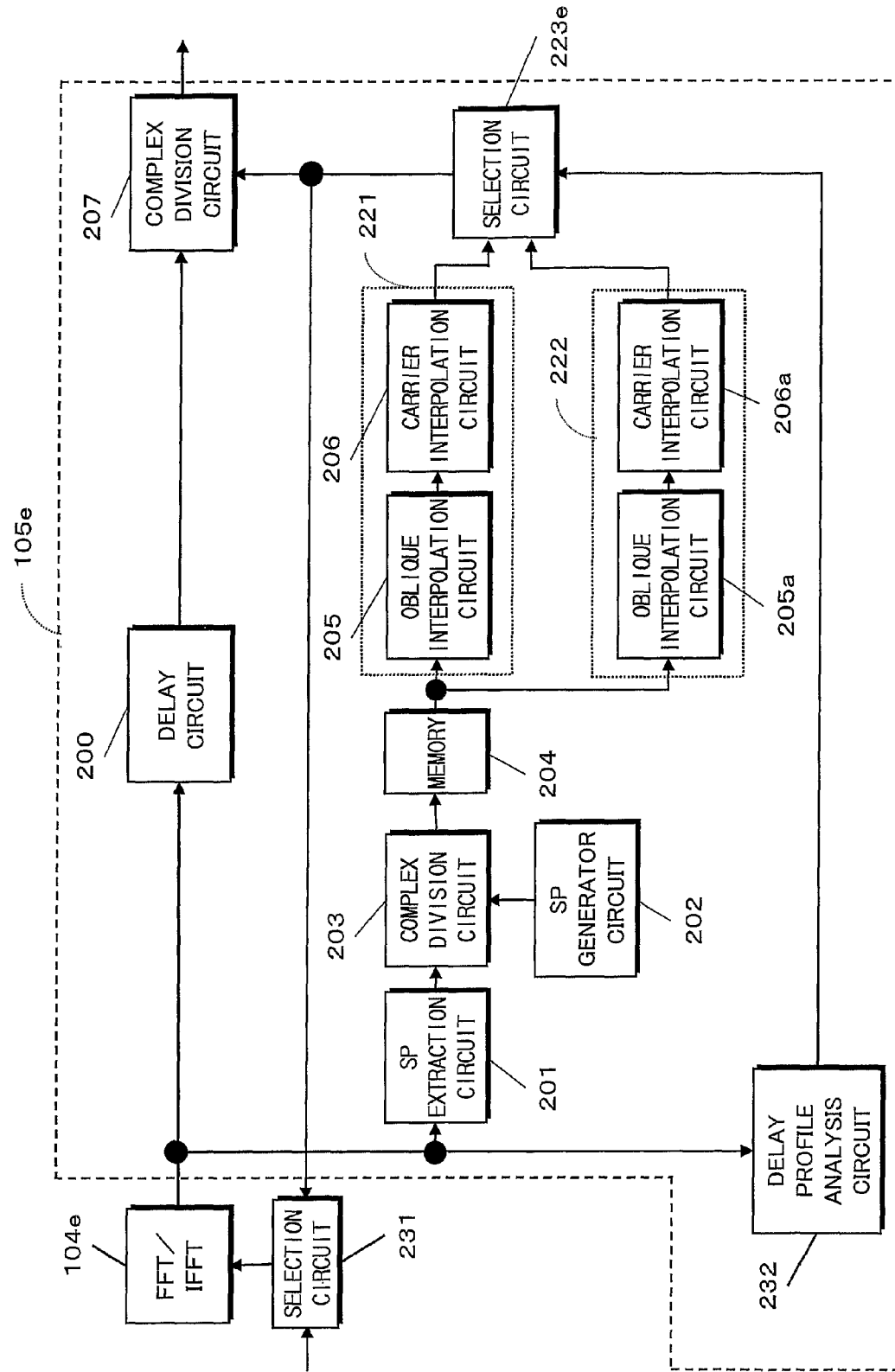
FIG. 11 is a block diagram showing a structure of a receiver according to the sixth embodiment.

The following describes the structure of the receiver according to the sixth embodiment, with reference to FIG. 11. FIG. 11 is a block diagram showing the structure of the receiver according to the sixth embodiment. FIG. 11 shows a selection circuit 231 arranged next to the quadrature demodulator circuit 103 shown in FIG. 1, an FFT/IFFT circuit 104e and an equalizing circuit 105e arranged next to the FFT/IFFT circuit 104e. A frequency deinterleaver circuit 106 is arranged next to the equalizing circuit 105e.

When the receiver is powered on, the selection circuit 231 selects the input from the quadrature demodulator circuit 103, between the input from the quadrature demodulator circuit 103 and the input from the selection circuit 223e, and outputs the selected input to the FFT/IFFT circuit 104e. This processing status is kept for a predetermined period (between the time when the receiver is powered on and the time when the FFT/IFFT circuit 104e performs the FFT processing on the last symbol in the one burst). After the predetermined period, the selection circuit 231 selects the input from the selection circuit 223e, between the input from the quadrature demodulator circuit 103 and the input from the selection circuit 223e, and outputs the selected input to the FFT/IFFT circuit 104e.

Upon power on of the receiver, the FFT/IFFT circuit 104e goes in the FFT processing status, and performs the Fast Fourier Transform on the signal input from the selection circuit 231, and outputs the signal resultant from the Fast Fourier Transform to each of the delay circuit 200 and the SP extraction circuit 201. This status will be kept for the above-described predetermined period. After the predetermined period, the FFT/IFFT circuit 104e switches the processing from the FFT processing to the IFFT processing, and performs Inverse Fast Fourier Transform on the signal input from the selection circuit 231, and outputs the signal resultant from the Inverse Fast Fourier Transform to a delay profile analysis circuit 232.

The equalizing circuit 105e includes a delay circuit 200, an SP extraction circuit 201, an SP generator circuit 202, a complex division circuit 203, a memory 204, an interpolation circuit 221, an interpolation circuit 222, a delay profile analysis circuit 232, a selection circuit 223e and a complex division circuit 207. The interpolation circuit 221 includes the oblique interpolation circuit 205 and the carrier interpolation circuit 206, which are explained in the first embodiment. The interpolation circuit 222 includes the oblique interpolation circuit 205a and the carrier interpolation circuit 206a, which are explained in the second embodiment.

The delay profile analysis circuit 232 analyzes the delay time and the level of the delayed wave that is delayed with respect to the principal wave, based on the signal resultant from the Inverse Fourier Transform, which is the delay profile, input from the FFT/IFFT circuit 104e. The delay profile analysis circuit 232 detects the delay time of the delayed wave whose level is higher than a predetermined level, based on the analysis result. The delay profile analysis circuit 232 outputs the maximum value of the detected delay time to the selection circuit 223e.

If the maximum value of the delay time of the delayed wave input from the delay profile analysis circuit 232 is not more than a predetermined time, the selection circuit 223e selects the input from the interpolation circuit 222, between the input from the interpolation circuit 221 and the input from the interpolation circuit 222. If the maximum value of the delay time of the delayed wave input from the delay profile analysis circuit 232 is more than the predetermined time, the selection circuit 223e selects the input from the interpolation circuit 221, between the input from the interpolation circuit 221 and the input from the interpolation circuit 222. This selection is applied to the burst transmission.

The selection circuit 223e outputs the input from the interpolation circuit that is selected at the previous burst transmission between from the input from the interpolation circuit 221 and the input from the interpolation circuit 222, to each of the complex division circuit 207 and the selection circuit 231.

In the case of the DVB-H system, if the frequency band is specified as 8 MHz and the 8 k mode is used, the effective symbol length is 896 μs. Accordingly, the maximum value of the delay time of the delayed wave that the interpolation circuit 222 can manage is 149 μs, which is ⅙ of the effective symbol length. Therefore, the above-described predetermined delay time is 149 μs.

This selection is performed in the following manner. The selection circuit 223e selects the interpolation circuit that performs the interpolation that can manage the delayed wave whose delay time is longest in the current burst transmission. If both of the interpolation processing performed by the interpolation circuit 221 and the interpolation processing performed by the interpolation circuit 222 can manage the delayed wave whose delay time is the longest in the current burst transmission, the selection circuit 223e selects the interpolation circuit that can manage a higher Doppler frequency.

<Processing Operations by Receiver>

The following describes processing operations performed by the receiver, with reference to FIG. 11. In the following explanation, it is assumed that the interpolation circuit 221 is selected for the previous burst transmission.

When the receiver is powered on, the selection circuit 231 outputs the input from the quadrature demodulator circuit 103 to the FFT/IFFT circuit 104e, and the FFT/IFFT circuit 104e performs the Fast Fourier Transform on the input from the selection circuit 231. The signal resultant from the Fast Fourier Transform performed by the FFT/IFFT circuit 104e is output from the FFT/IFFT circuit 104e to the delay circuit 200 and the SP extraction circuit 201.

The SP extraction circuit 201 extracts SP signals from the signal resultant from the Fast Fourier Transform, and outputs the extracted SP signals to the complex division circuit 203. At this moment, the SP generator circuit 202 provides the complex division circuit 203 with SP signals that are the same as the SP signals at the time of transmission by the transmitter. The complex division circuit 203 performs the complex division on the SP signals input from the SP extraction circuit 201, using the signals provided by the SP generator circuit 202, to calculate the channel characteristics of each SP signal position. The memory 204 stores the channel characteristics of each SP signal position.

Once a predetermined number of groups of channel characteristics are stored in the memory 204, the interpolation circuit 221 performs the oblique interpolation processing and the frequency axis interpolation processing, which are described in the first embodiment, and outputs the interpolation result to the selection circuit 223e. Meanwhile, the interpolation circuit 222 performs the oblique interpolation processing and the frequency axis interpolation, which are described in the second embodiment, and outputs the interpolation result to the selection circuit 223e.

Since the interpolation circuit 221 is selected for the previous burst transmission, the selection circuit 223e selects the input from the interpolation circuit 221, and outputs the input to the complex division circuit 207.

The information transmission signals and soon, which are output from the FFT/IFFT circuit 104e, are delayed by the delay circuit 200, and input to the complex division circuit 207. The complex division circuit 207 performs the complex division on the information transmission signals, using the channel characteristics of each information transmission signal position, and transmits the resultant signals to the frequency deinterleaver circuit 106 at the next stage.

This status lasts for the predetermined period.

After the predetermined period, the selection circuit 231 switches the input to be output to the FFT/IFFT circuit 104e from the input from the quadrature demodulator circuit 104e to the input from the selection circuit 223e, and the FFT/IFFT circuit 104e switches the processing from the FFT processing to the IFFT processing.

The selection circuit 231 outputs the input from the selection circuit 223e to the FFT/IFFT 104e, and the FFT/IFFT circuit 104e performs the Inverse Fast Fourier Transform on the input from the selection circuit 231. The signal resultant from the Inverse Fast Fourier Transform performed by the FFT/IFFT circuit 104e is output from the FFT/IFFT circuit 104e to the delay profile analysis circuit 232.

The delay profile analysis circuit 232 performs the above-described analysis based on the input from the FFT/IFFT circuit 204e, and outputs the maximum value of the delay time of the delayed wave in the last symbol in the current burst processing to the selection circuit 223e. The selection circuit 223e performs the selection based on the maximum value of the delay time of the delayed wave input from the delay profile analysis circuit 232. In the next burst transmission, the input from the selected interpolation circuit is output to each of the complex division circuit 207 and the selection circuit 231.

In the case where the interpolation circuit 222 is selected in the previous burst, the selection circuit 223e selects the input from the interpolation circuit 222, and outputs the input to the complex division circuit 207.

The Seventh Embodiment

The following describes the seventh embodiment of the present invention, with reference to the drawings. Note that the seventh embodiment includes three routes for the interpolation processing in contrast to the fifth embodiment that has only two routes for the interpolation processing. The same reference sign is used for indicating the same constituent having the same function as that in the above-described embodiments, and its explanation is omitted, because the explanations in the above-described embodiments are applicable.

<Structure of Receiver>

Figure 12:
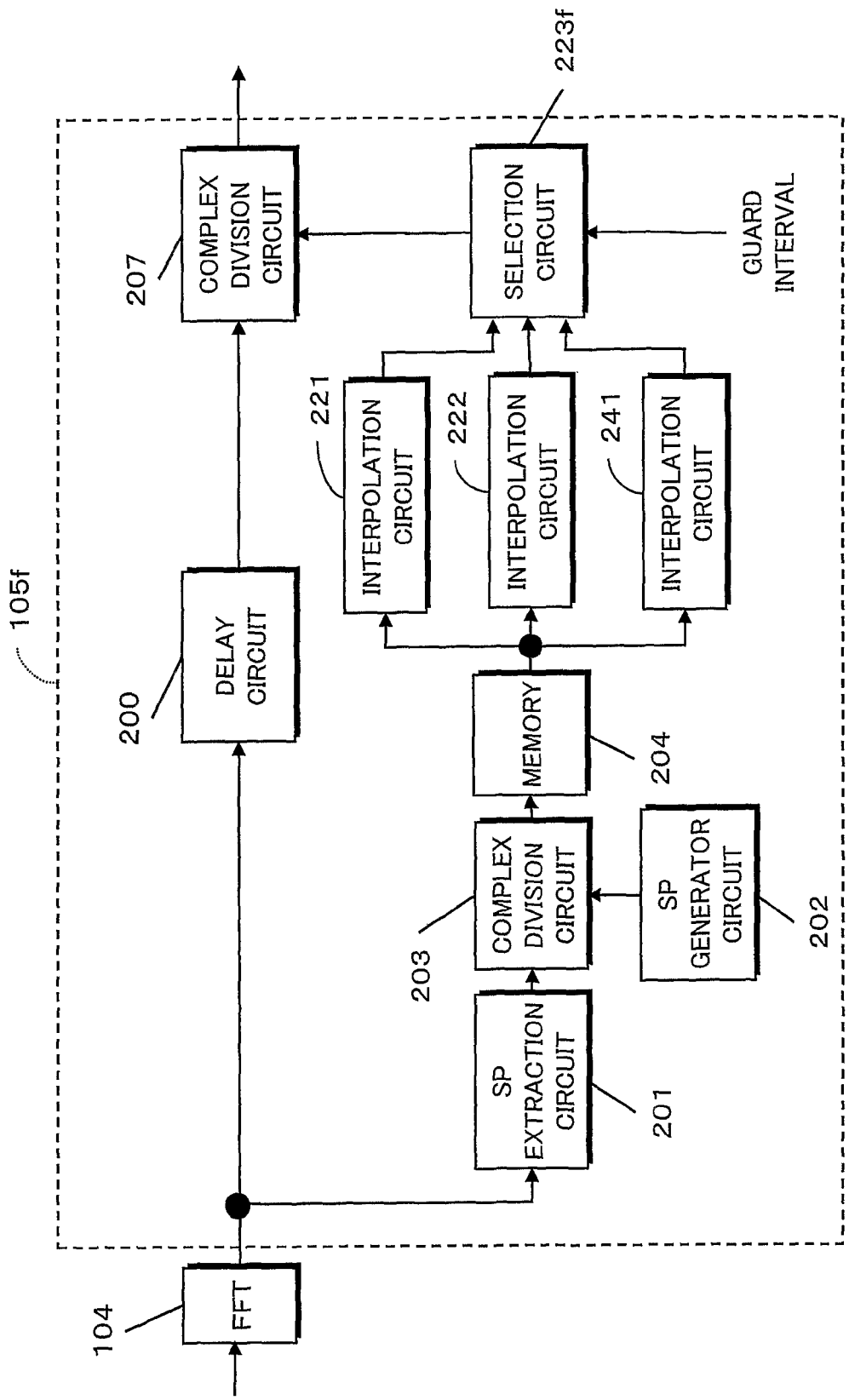
FIG. 12 is a block diagram showing a structure of a receiver according to the seventh embodiment.

The following describes the structure of the receiver according to the seventh embodiment, with reference to FIG. 12. FIG. 12 is a block diagram showing the structure of the receiver according to the seventh embodiment. FIG. 12 shows an FFT circuit 104 arranged next to the quadrature demodulator circuit 103 shown in FIG. 1, and an equalizing circuit 105f arranged next to the FFT circuit 104. A frequency deinterleaver circuit 106 is arranged next to the equalizing circuit 105f.

The equalizing circuit 105e includes a delay circuit 200, an SP extraction circuit 201, an SP generator circuit 202, a complex division circuit 203, a memory 204, an interpolation circuit 221, an interpolation circuit 222, an interpolation circuit 241, a selection circuit 223f and a complex division circuit 207. The interpolation circuit 221 includes the oblique interpolation circuit 205 and the carrier interpolation circuit 206, which are explained in the first embodiment. The interpolation circuit 222 includes the oblique interpolation circuit 205a and the carrier interpolation circuit 206a, which are explained in the second embodiment.

The interpolation circuit 241 interpolates the channel characteristics of the signal positions except for the SP signal positions, using the channel characteristics of the SP signal position calculated by the complex division performed by the complex division circuit 203. The interpolation circuit 241, which is not illustrated, includes the carrier interpolation circuit 206c and performs only the frequency axis interpolation.

If the parameter for the guard interval is $1/4$, the selection circuit 223f selects the input from the interpolation circuit 221, and outputs the input from the interpolation circuit 221 to the complex division circuit 207. If the parameter for the guard interval is $1/8$, the selection circuit 223f selects the input from the interpolation circuit 222, and outputs the input from the interpolation circuit 222 to the complex division circuit 207. If the parameter for the guard interval is $1/16$ or $1/32$, the selection circuit 223f selects the input from the interpolation circuit 241, and outputs the input from the interpolation circuit 241 to the complex division circuit 207.

This selection is performed in the following manner. The selection circuit 223f selects the interpolation circuit that performs the interpolation that can manage the delayed wave that is delayed for a time equal to the product of the effective symbol length and the parameter for the guard interval. In the case where any two or more of the interpolation circuit 221, the interpolation circuit 222 and the interpolation circuit 241 can manage the delayed wave that is delayed for a time equal to the product of the effective symbol length and the parameter for the guard interval, the selection circuit 223f selects the interpolation circuit that can manage a higher Doppler frequency.

<Processing Operations by Receiver>

The following describes processing operations performed by the receiver, with reference to FIG. 12. In the following explanation, it is assumed that a value $1/4$ is set to the parameter for the guard interval.

The signal resultant from the Fast Fourier Transform performed by the FFT circuit 104 is output from the FFT circuit 104 to the delay circuit 200 and the SP extraction circuit 201.

The SP extraction circuit 201 extracts SP signals from the signal resultant from the Fast Fourier Transform, and outputs the extracted SP signals to the complex division circuit 203. At this moment, the SP generator circuit 202 provides the complex division circuit 203 with SP signals that are the same as the SP signals at the time of transmission by the transmitter. The complex division circuit 203 performs the complex division on the SP signals input from the SP extraction circuit 201, using the signals provided by the SP generator circuit 202, to calculate the channel characteristics of each SP signal position. The memory 204 stores the channel characteristics of each SP signal position.

Once a predetermined number of groups of channel characteristics are stored in the memory 204, the interpolation circuit 221 performs the oblique interpolation processing and the frequency axis interpolation processing, which are described in the first embodiment, and outputs the interpolation result to the selection circuit 223f. Meanwhile, the interpolation circuit 222 performs the oblique interpolation processing and the frequency axis interpolation, which are described in the second embodiment, and outputs the interpolation result to the selection circuit 223f. Meanwhile, the interpolation circuit 241 performs the frequency axis interpolation, which is described in the fourth embodiment, and outputs the interpolation result to the selection circuit 223f.

Since the parameter for the guard interval is $1/4$, the selection circuit 223f selects the input from the interpolation circuit 221, and outputs the input to the complex division circuit 207.

The information transmission signals and soon, which are output from the FFT circuit 104, are delayed by the delay circuit 200, and input to the complex division circuit 207. The complex division circuit 207 performs the complex division on the information transmission signals, using the channel characteristics of each information transmission signal position, and transmits the resultant signals to the frequency deinterleaver circuit 106 at the next stage.

In the case where the parameter for the guard interval is $1/8$, the selection circuit 223f selects the input from the interpolation circuit 222, and outputs the input to the complex division circuit 207. In the case where the parameter for the guard interval is 1/16 or 1/32, the selection circuit 223*f* selects the input from the interpolation circuit 241, and outputs the input to the complex division circuit 207.

The Eighth Embodiment

The following describes the eighth embodiment of the present invention, with reference to the drawings. Note that the eighth embodiment applies a filtering of the channel characteristics of the SP signal positions before performing the oblique interpolation processing explained in the third embodiment. The same reference sign is used for indicating the same constituent having the same function as that in the above-described embodiments, and its explanation is omitted because the explanations in the above-described embodiments are applicable.

<Structure of Receiver>

Figure 13:
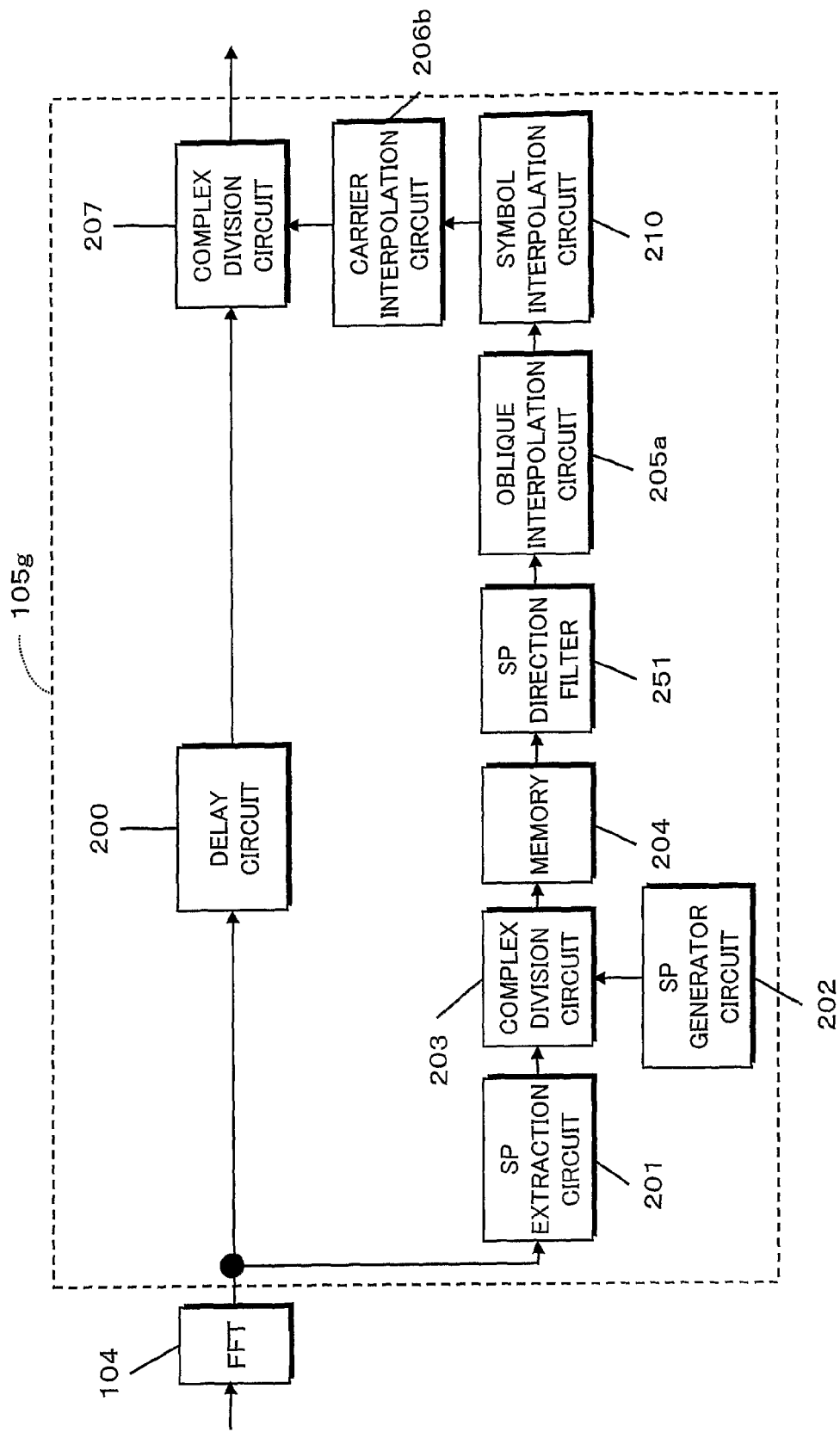
FIG. 13 is a block diagram showing a structure of a receiver according to the eighth embodiment.

The following describes the structure of the receiver according to the eighth embodiment, with reference to FIG. 13. FIG. 13 is a block diagram showing the structure of the receiver according to the eighth embodiment. FIG. 13 shows an FFT circuit 104 arranged next to the quadrature demodulator circuit 103 shown in FIG. 1, and an equalizing circuit 105*g* arranged next to the FFT circuit 104. A frequency deinterleaver circuit 106 is arranged next to the equalizing circuit 105*g*.

The equalizing circuit 105*g* includes a delay circuit 200, an SP extraction circuit 201, an SP generator circuit 202, a complex division circuit 203, a memory 204, an SP direction filter 251, an oblique interpolation circuit 205*a*, a symbol interpolation circuit 210, a carrier interpolation circuit 206*b* and a complex division circuit 207.

Figure 14:
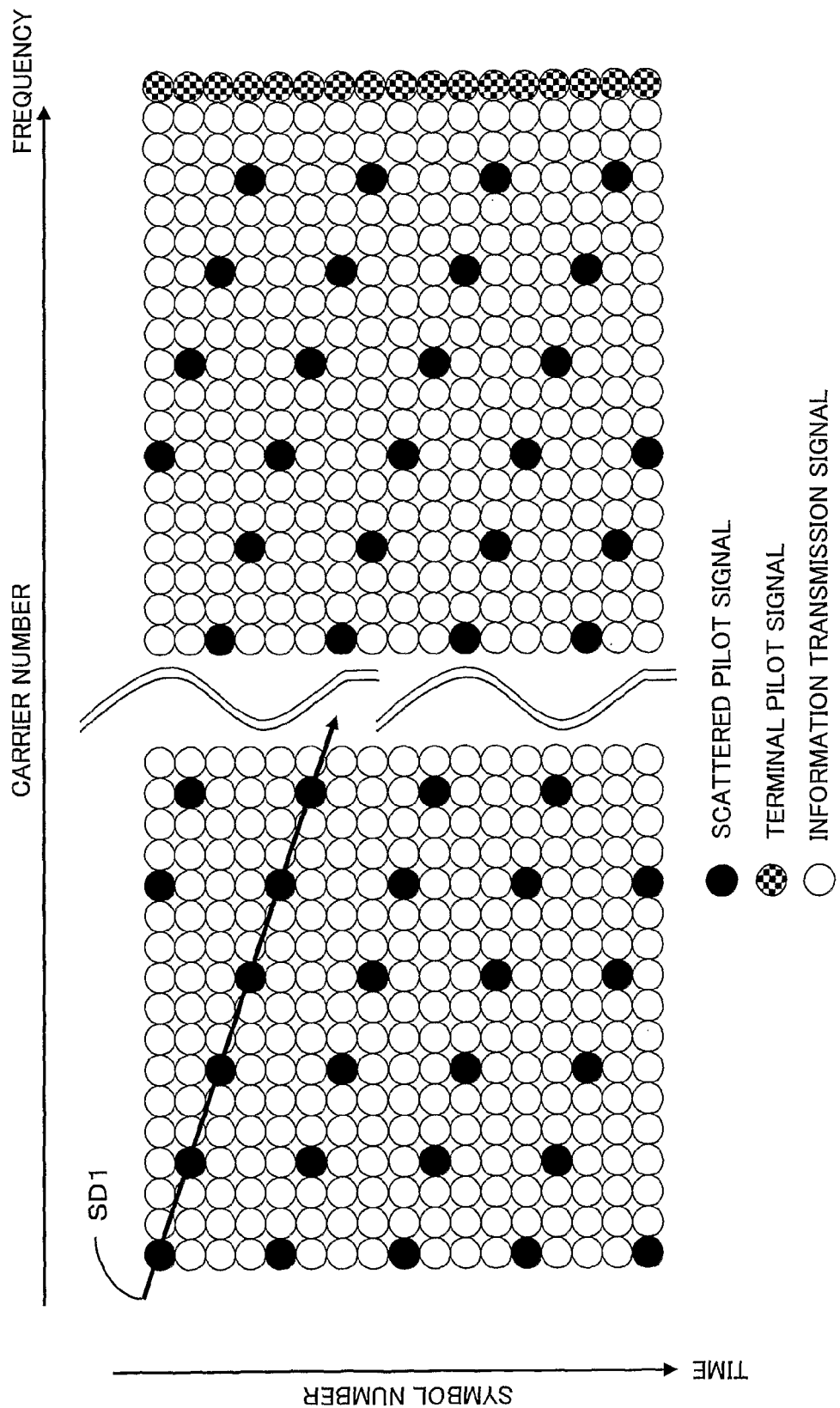
FIG. 14 is a drawing for explaining filtering processing performed by a SP-direction filter of FIG. 13.
Figure 15:
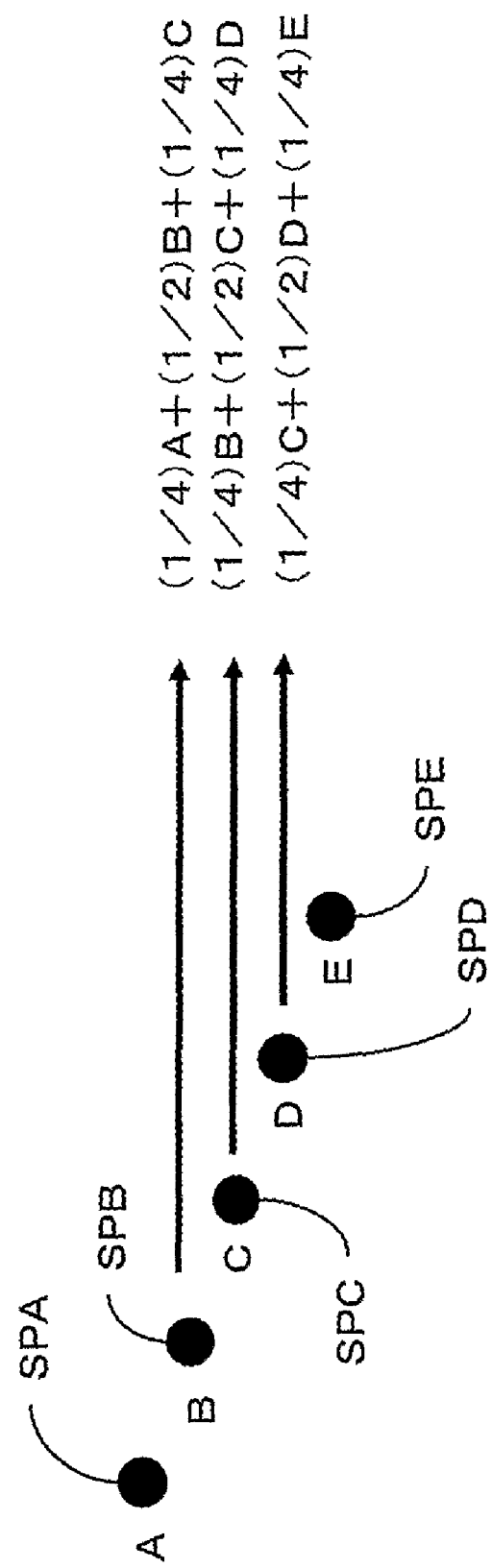
FIG. 15 is a drawing for explaining filtering processing performed by a SP-direction filter of FIG. 13.

The SP direction filter 251 performs filtering on the channel characteristics of the SP signal position, which is calculated by the complex division circuit 207, to correct the channel characteristics. This is explained next with reference to FIG. 14 and FIG. 15. FIG. 14 and FIG. 15 are drawings for explaining the processing performed by the SP direction filter 251 shown in FIG. 13. Note that only the SP signals indicated by the arrow in FIG. 14 are shown in FIG. 15.

The SP direction filter 251 corrects the channel characteristics of the SP signal positions in an oblique direction (the direction indicated by a sign SD1 in FIG. 14), by which the symbol number increases by one in the time axis direction and the carrier number decreases by three in the frequency direction with respect to the position where each SP signal exists.

For simplification, the SP direction filter 251 in the eighth embodiment is assumed to be a 3-tap filter.

Assume that values of the channel characteristics of SP signal positions SPA, SPB, SPC, SPD and SPE are respectively represented by A, B, C, D and E. By the filtering using the 3-tap filter, the value of the channel characteristics of the SP signal position SPB will be corrected to $(1/4)A+(1/2)B+(1/4)C$. The value of the channel characteristics of the SP signal position SPC will be corrected to $(1/4)B+(1/2)C+(1/4)D$. The value of the channel characteristics of the SP signal position SPD will be corrected to $(1/4)C+(1/2)D+(1/4)E$.

<Processing Operations by Receiver>

The following describes processing operations performed by the receiver according to the eighth embodiment, with reference to FIG. 13.

The signal resultant from the Fast Fourier Transform performed by the FFT circuit 104 is output from the FFT circuit 104 to the delay circuit 200 and the SP extraction circuit 201.

The SP extraction circuit 201 extracts SP signals from the signal resultant from the Fast Fourier Transform, and outputs the extracted SP signals to the complex division circuit 203.

At this moment, the SP generator circuit 202 provides the complex division circuit 203 with SP signals that are the same as the SP signals at the time of transmission by the transmitter. The complex division circuit 203 performs the complex division on the SP signals input from the SP extraction circuit 201, using the signals provided by the SP generator circuit 202, to calculate the channel characteristics of each SP signal position. The memory 204 stores the channel characteristics of each SP signal. Once a predetermined number of groups of channel characteristics are stored in the memory 204, the SP direction filter 251 performs the above-described filtering.

After the SP direction filter 251 performs the filtering, the interpolation described in the third embodiment (the oblique interpolation processing performed by the oblique interpolation circuit 205*a*, the time axis interpolation processing performed by the symbol interpolation circuit 210 and the frequency axis interpolation performed by the carrier interpolation circuit 206*b*) is performed.

The information transmission signals and soon, which are output from the FFT circuit 104, are delayed by the delay circuit 200, and input to the complex division circuit 207. The complex division circuit 207 performs the complex division on the information transmission signals, using the channel characteristics of each information transmission signal position, and transmits the resultant signals to the frequency deinterleaver circuit 106 at the next stage.

According to the receiver as described above, noises are removed from the SP signals by the SP direction filter 251, and the interpolation and the equalizing is performed using the signal from which the noises are removed. Accordingly, it becomes possible to improve the reception performance.

Note that, although depending on the number of the taps and the type of the filter, the delay time of the delayed wave that can be equalized might be shorten by the filtering performed by the SP direction filter 251, which is the same as the case of the receiver of the third embodiment. However, even if the filtering performed by the SP direction filter 251 is applied before the interpolation processing is performed by the oblique interpolation circuit 205*a*, the delay time of the delayed wave that can be equalized by the filtering will not be further shortened.

The Ninth Embodiment

The following describes the ninth embodiment of the present invention, with reference to the drawings. Note that the ninth embodiment includes two routes for the interpolation processing in contrast to the eighth embodiment having only one route for the interpolation processing. The same reference sign is used for indicating the same constituent having the same function as that in the above-described embodiments, and its explanation is omitted because the explanations in the above-described embodiments are applicable.

<Structure of Receiver>

Figure 16:
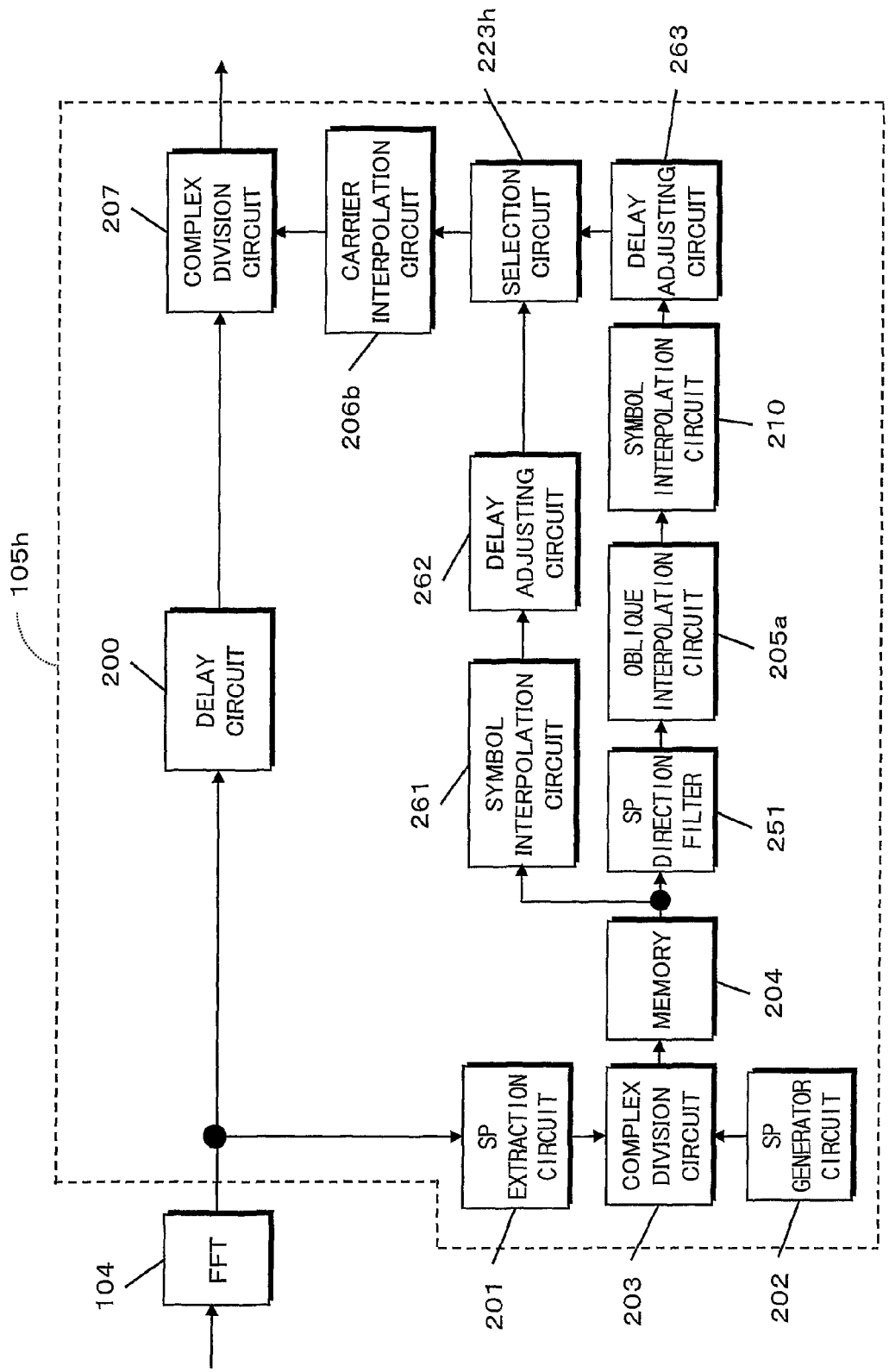
FIG. 16 is a block diagram showing a structure of a receiver according to the ninth embodiment.

The following describes the structure of the receiver according to the ninth embodiment, with reference to FIG. 16. FIG. 16 is a block diagram showing the structure of the receiver according to the ninth embodiment. FIG. 16 shows an FFT circuit 104 arranged next to the quadrature demodulator circuit 103 shown in FIG. 1, and an equalizing circuit 105*h* arranged next to the FFT circuit 104. A frequency deinterleaver circuit 106 is arranged next to the equalizing circuit 105*h*.

The equalizing circuit 105*h* includes a delay circuit 200, an SP extraction circuit 201, an SP generator circuit 202, a complex division circuit 203, a memory 204, a symbol interpolation circuit 261, a delay adjusting circuit 262, an SP direction filter 251, an oblique interpolation circuit 205a, a symbol interpolation circuit 210, a delay adjusting circuit 263, a selection circuit 223h, a carrier interpolation circuit 206b, a complex division circuit 207.

Figure 21:
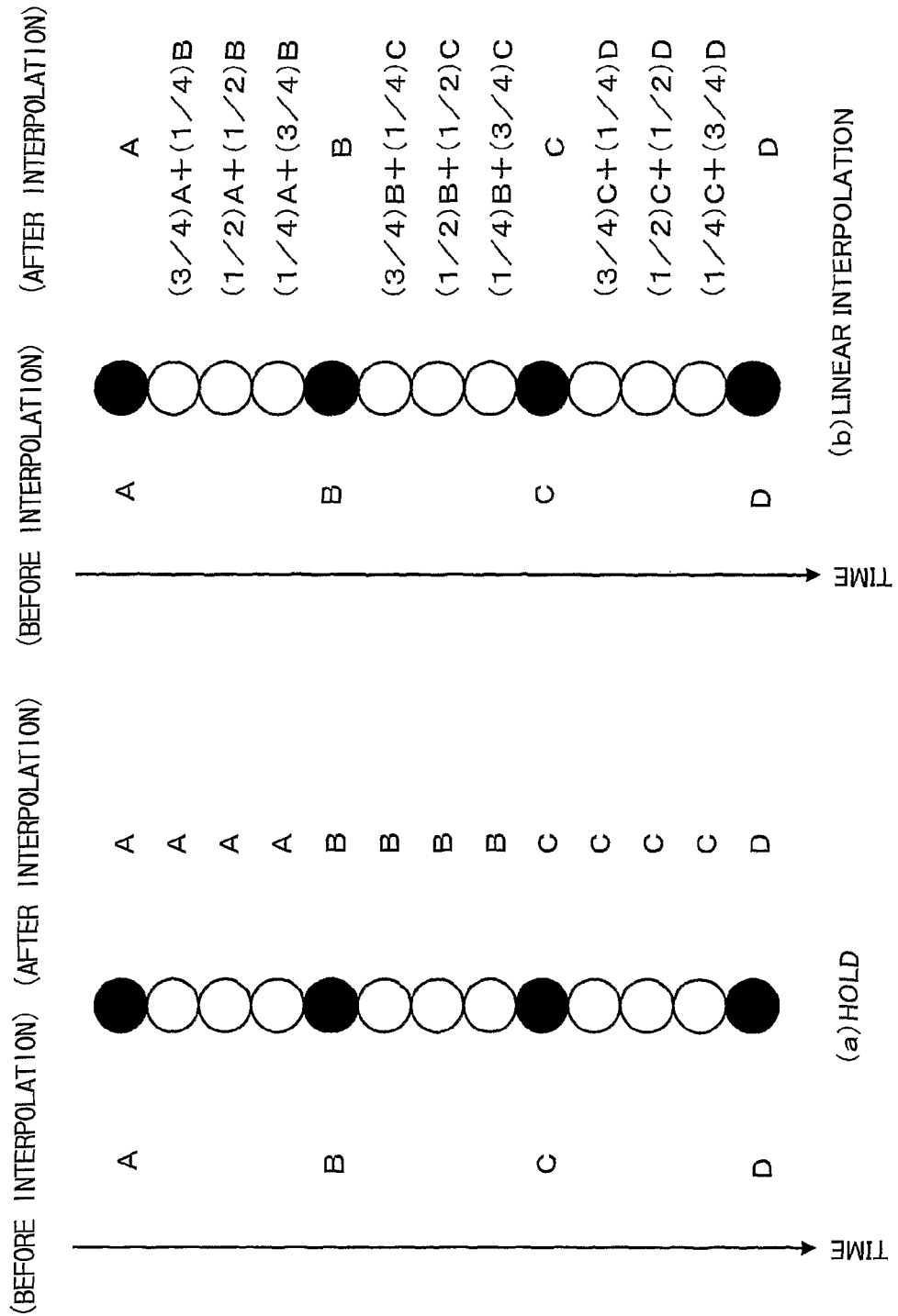
FIG. 21 is a drawing for explaining a conventional time axis interpolation.

The symbol interpolation circuit 261 performs the time axis interpolation. The symbol interpolation circuit 210 interpolates the channel characteristics of the signal positions that are arranged in the time axis direction (i.e. the signal positions having the same carrier number) and whose channel characteristics have not been obtained, using the already obtained channel characteristics. This is performed for each sub-carrier that carries the SP signal. Note that the symbol interpolation circuit 261 interpolates the channel characteristics of the SP signal positions shown in FIG. 21 (b) by the linear interpolation among four symbols.

Each of the delay adjusting circuits 262 and 263 adjusts the delay times of the output from the symbol interpolation circuit 261 and the output from the symbol interpolation circuit 210 so that the output from the symbol interpolation circuit 261 and the output from the symbol interpolation circuit 210 are at the same signal position when they are input in the selection circuit 223h.

If the parameter for the guard interval is ¼, the selection circuit 223h selects the input from the delay adjusting circuit 262 between the input from the delay adjusting circuit 262 and the input from the delay adjusting circuit 263, and outputs the input from the delay adjusting circuit 262 to the carrier interpolation circuit 206b.

If the parameter for the guard interval is ⅛, 1/16 or 1/32, the selection circuit 223h selects the input from the delay adjusting circuit 263 between the input from the delay adjusting circuit 262 and the input from the delay adjusting circuit 263, and outputs the input from the delay adjusting circuit 263 to the carrier interpolation circuit 206b.

This selection is performed in the following manner. The selection circuit 223h selects the interpolation processing that can manage the delayed wave that is delayed for a time equal to the product of the effective symbol length and the parameter for the guard interval. In the case where both of the interpolation processing can manage the delayed wave that is delayed for a time equal to the product of the effective symbol length and the parameter for the guard interval, the selection circuit 223h selects the interpolation processing that can manage a higher Doppler frequency.

<Processing Operations by Receiver>

The following describes processing operations performed by the receiver, with reference to FIG. 16. In the following explanation, it is assumed that a value ¼ is set to the parameter for the guard interval.

The signal resultant from the Fast Fourier Transform performed by the FFT circuit 104 is output from the FFT circuit 104 to the delay circuit 200 and the SP extraction circuit 201.

The SP extraction circuit 201 extracts SP signals from the signal resultant from the Fast Fourier Transform, and outputs the extracted SP signals to the complex division circuit 203. At this moment, the SP generator circuit 202 provides the complex division circuit 203 with SP signals that are the same as the SP signals at the time of transmission by the transmitter. The complex division circuit 203 performs the complex division on the SP signals input from the SP extraction circuit 201, using the signals provided by the SP generator circuit 202, to calculate the channel characteristics of each SP signal position. The memory 204 stores the channel characteristics of each SP signal position.

Once a predetermined number of groups of channel characteristics are stored in the memory 204, the above-described time axis interpolation is performed by the symbol interpolation circuit 261. The output from the symbol interpolation circuit 261 is delayed by the delay adjusting circuit 262, and input to the selection circuit 223h.

Meanwhile, the SP direction filter 251 performs the filtering described in the eighth embodiment. Then, the oblique interpolation circuit 205a performs the oblique interpolation, and the symbol interpolation circuit 210 performs the time axis interpolation, which are described in the third embodiment. The output from the symbol interpolation circuit 210 is delayed by the delay adjusting circuit 263, and input to the selection circuit 223h.

Since the parameter for the guard interval is ¼, the selection circuit 223h selects the input from the delay adjusting circuit 262, and outputs the input to the carrier interpolation circuit 206b, and the carrier interpolation circuit 206b performs the frequency axis interpolation explained in the third embodiment.

The information transmission signals and soon, which are output from the FFT circuit 104, are delayed by the delay circuit 200, and input to the complex division circuit 207. The complex division circuit 207 performs the complex division on the information transmission signals, using the channel characteristics of each information transmission signal position, and transmits the resultant signals to the frequency deinterleaver circuit 106 at the next stage.

In the case where the parameter for the guard interval is ⅛, 1/16 or 1/32, the selection circuit 223h selects the input from the delay adjusting circuit 263, and outputs the input to the carrier interpolation circuit 206b.

The Tenth Embodiment

The following describes the tenth embodiment of the present invention, with reference to drawings. Note that the tenth embodiment includes two routes for the interpolation processing. The same reference sign is used for indicating the same constituent having the same function as that in the above-described embodiments, and its explanation is omitted, because the explanations in the above-described embodiments are applicable.

<Structure of Receiver>

Figure 17:
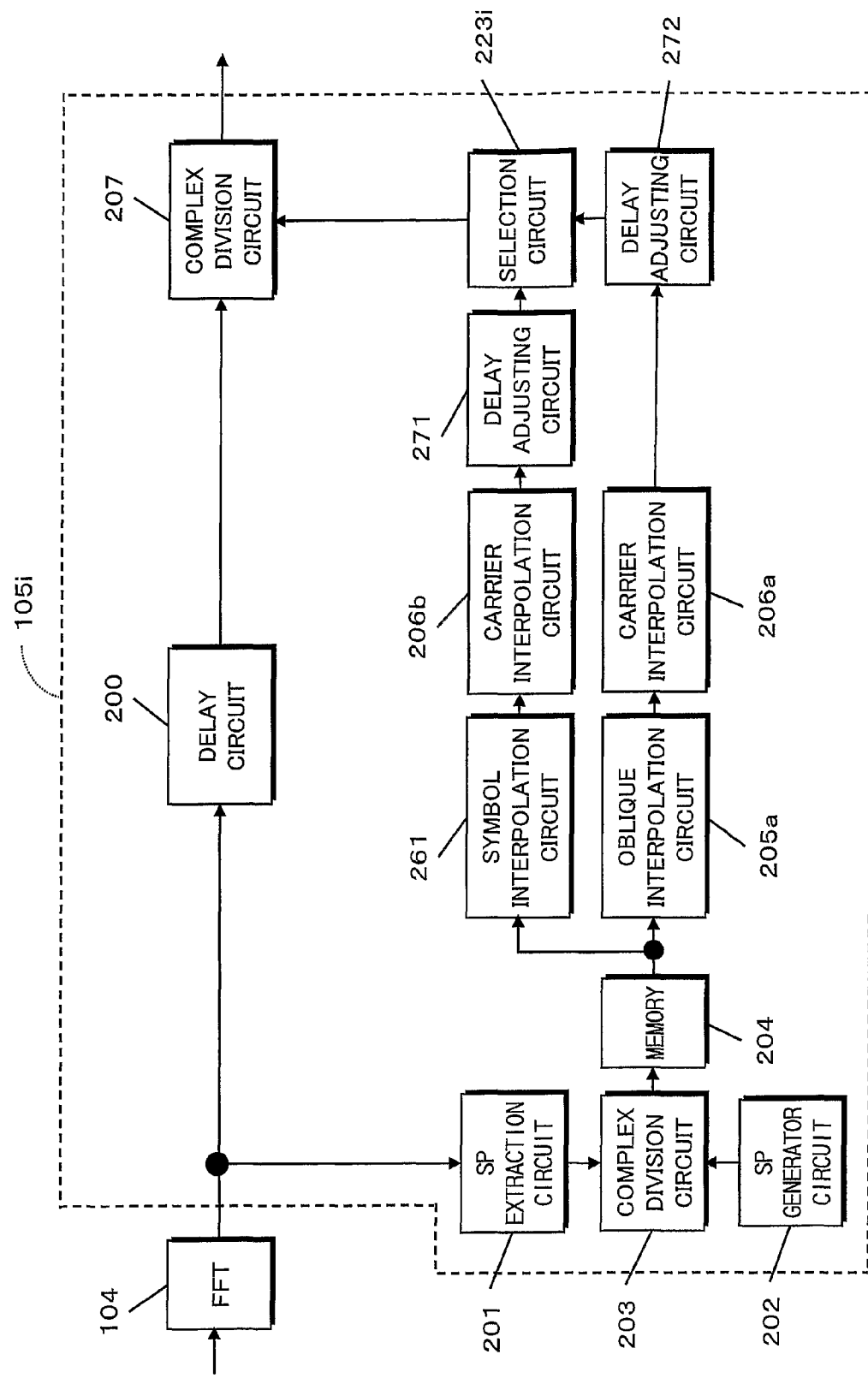
FIG. 17 is a block diagram showing a structure of a receiver according to the tenth embodiment.

The following describes the structure of the receiver according to the tenth embodiment, with reference to FIG. 17. FIG. 17 is a block diagram showing the structure of the receiver according to the tenth embodiment. FIG. 17 shows an FFT circuit 104 arranged next to the quadrature demodulator circuit 103 shown in FIG. 1, and an equalizing circuit 105i arranged next to the FFT circuit 104. A frequency deinterleaver circuit 106 is arranged next to the equalizing circuit 105i.

The equalizing circuit 105i includes a delay circuit 200, an SP extraction circuit 201, an SP generator circuit 202, a complex division circuit 203, a memory 204, a symbol interpolation circuit 261, a carrier interpolation circuit 206b, a delay adjusting circuit 271, an oblique interpolation circuit 205a, a carrier interpolation circuit 206a, a delay adjusting circuit 272, a selection circuit 223i, a carrier interpolation circuit 206b and a complex division circuit 207.

Each of the delay adjusting circuits 271 and 272 adjusts the delay time of the output from the carrier interpolation circuit 206b and the output from the carrier interpolation circuit 206a so that the output from the carrier interpolation circuit 206b and the output from the carrier interpolation circuit 206a are at the same signal position when they are input in the selection circuit 223i.

The selection circuit 223i calculates a CN ratio (ratio of average carrier power to average noise power) based on the signal resultant from the down convert performed by the tuner unit. If the CN ratio is less than a predetermined value, the selection circuit 223i selects the input from the delay adjusting circuit 271, between the input from the delay adjusting circuit 271 and the input from the delay adjusting circuit 272, and outputs the selected input to the complex division circuit 207. If the CN ratio is equal to or grater than the predetermined value, the selection circuit 223i selects the input from the delay adjusting circuit 272, between the input from the delay adjusting circuit 271 and the input from the delay adjusting circuit 272, and outputs the selected input to the complex division circuit 207. This is because the reception performance of the interpolation processing performed by the symbol interpolation circuit 261 and the carrier interpolation circuit 206b is better than the interpolation processing performed by the oblique interpolation circuit 205a and the carrier interpolation circuit 206a in an AWGN environment.

<Processing Operations by Receiver>

The following describes processing operations performed by the receiver, with reference to FIG. 17. In this explanation, the CN ratio is assumed to be less than the predetermined value.

The signal resultant from the Fast Fourier Transform performed by the FFT circuit 104 is output from the FFT circuit 104 to the delay circuit 200 and the SP extraction circuit 201.

The SP extraction circuit 201 extracts SP signals from the signal resultant from the Fast Fourier Transform, and outputs the extracted SP signals to the complex division circuit 203. At this moment, the SP generator circuit 202 provides the complex division circuit 203 with SP signals that are the same as the SP signals at the time of transmission by the transmitter. The complex division circuit 203 performs the complex division on the SP signals input from the SP extraction circuit 201, using the signals provided by the SP generator circuit 202, to calculate the channel characteristics of each SP signal position. The memory 204 stores the channel characteristics of each SP signal position.

Once a predetermined number of groups of channel characteristics are stored in the memory 204, the symbol interpolation circuit 261 performs the above-described time axis interpolation, and the carrier interpolation circuit 206b performs the above-described frequency axis interpolation. The output from the carrier interpolation circuit 206b is delayed by the delay adjusting circuit 271, and input to the selection circuit 223i.

Meanwhile, the oblique interpolation circuit 205a performs the above-described oblique interpolation processing, and the carrier interpolation circuit 206a performs the above-described frequency axis interpolation processing. The output from the carrier interpolation circuit 206a is delayed by the delay adjusting circuit 272, and input to the selection circuit 223i.

Since the CN ratio is less than the predetermined value, the selection circuit 223i selects the input from the delay adjusting circuit 271, and outputs the input to the complex division circuit 207.

The information transmission signals and so on, which are output from the FFT circuit 104, are delayed by the delay circuit 200, and input to the complex division circuit 207. The complex division circuit 207 performs the complex division on the information transmission signals, using the channel characteristics of each information transmission signal position, and transmits the resultant signals to the frequency deinterleaver circuit 106 at the next stage.

If the CN ratio is equal to or more than the predetermined period, the selection circuit 223i selects the input from the delay adjusting circuit 272, and outputs the input to the complex division circuit 207.

<Terminal Processing>

Figure 18:
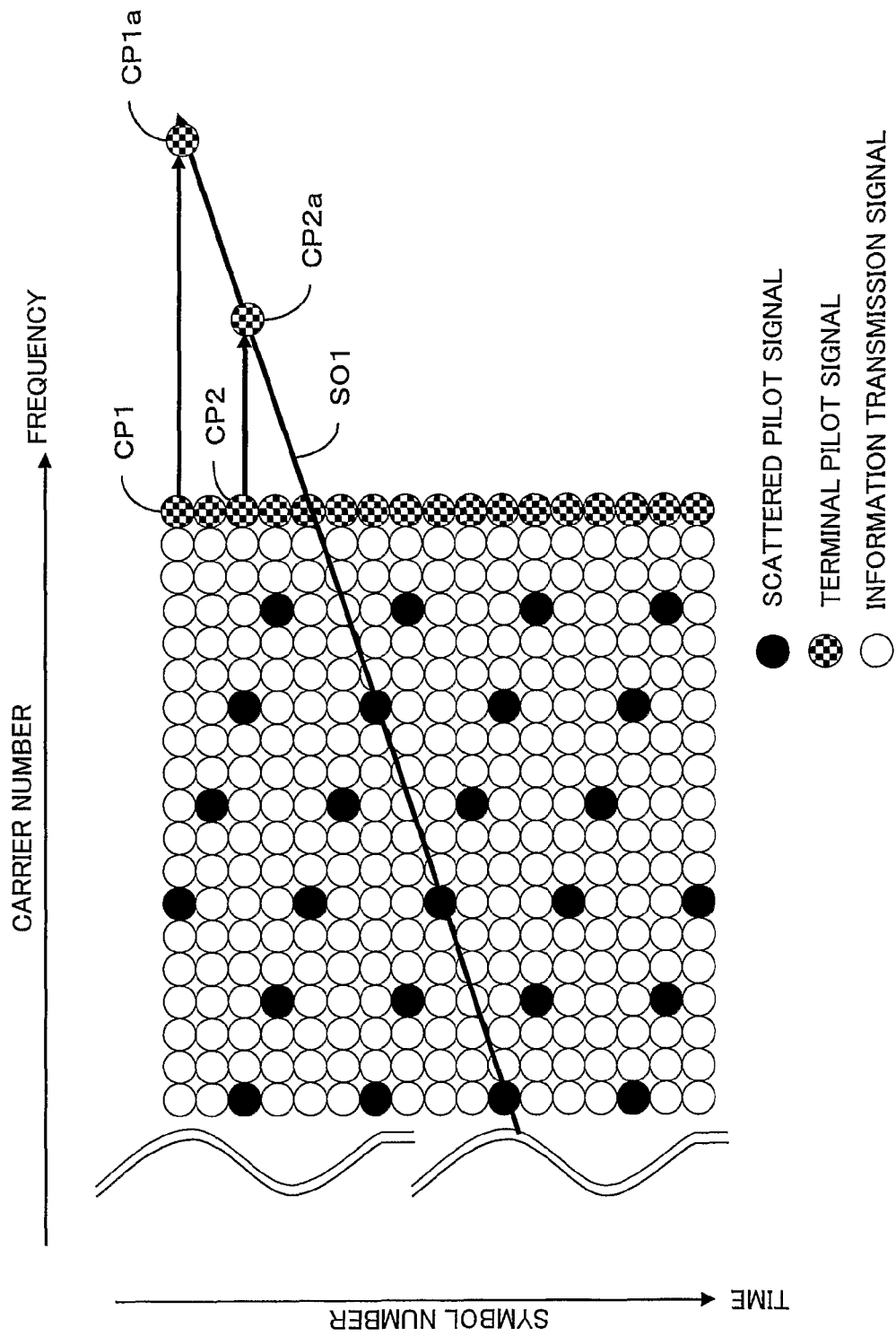
FIG. 18 is a drawing for explaining terminal processing performed by a receiver.

The following describes terminal processing performed on high frequency terminal signals by the above-described oblique interpolation circuit and SP direction filter, with reference to FIG. 18. FIG. 18 is a drawing for explaining the terminal processing performed by the oblique interpolation circuit and the SP direction filter. In the following explanation, the terminal on the high frequency side is called the right terminal, and the terminal on the low frequency side is called the left terminal.

The oblique interpolation circuit performs the oblique interpolation in order to apply the time axis interpolation. However, the frequency axis interpolation is applied as well. Therefore, if the oblique interpolation is performed, it is necessary to perform the terminal processing on the terminal. The SP direction filter also performs the filtering in the oblique direction. If the filtering is performed, it is necessary to perform the terminal processing on the terminal.

Each of the oblique interpolation circuit and SP direction filter extracts a CP signal output from the FFT circuit or the FFT/IFFT circuit, and performs the complex division on the extracted CP signal, using signals having the same amplitude and phase as a CP signal at the time of the transmission by the transmitter, to calculate the channel characteristics of the CP signal position.

Each of the oblique interpolation circuit and the SP direction filter performs extrapolation of the signals at the positions outside the bandwidth, using the CP signals at the terminal. This is performed in such a direction that the symbol number decreases by one in the time axis direction and the carrier number increases by three in the frequency axis direction (the direction indicated by a sign SO1 in FIG. 18). The extrapolation is performed by copying the channel characteristics of the terminal CP signal position having the same symbol number.

For instance, the value of a position CP1a on the arrow SO1, which is extended in the oblique direction, is copied from the value of a CP signal at a terminal position CP1, whose symbol number is the same as the position CP1a. The value of a position CP2a is copied from the value of a CP signal at a terminal position CP2, whose symbol number is the same as the position CP2a.

Note that in the case of the DVB-T system and the DVB-H system, the CP signals are arranged at the left terminal, and the above-described terminal processing is applicable to those methods as it is.

However, in the case of the ISDB-T system, the CP signals are not arranged at the left terminal, and the above-described terminal processing is not applicable as it is. To perform the terminal processing at the left terminal, the channel characteristics of each SP signal position arranged at the left terminal and having the same symbol number are copied for the extrapolation. Alternatively, the time axis interpolation shown in FIG. 21 (b) and so on is performed at the sub-carrier positions at the left terminal to obtain the channel characteristics of all the sub-carriers at the left terminal, the channel characteristics of the sub-carriers at the left terminal are copied for the extrapolation.

<Other Terminal Processing>

Figure 19:
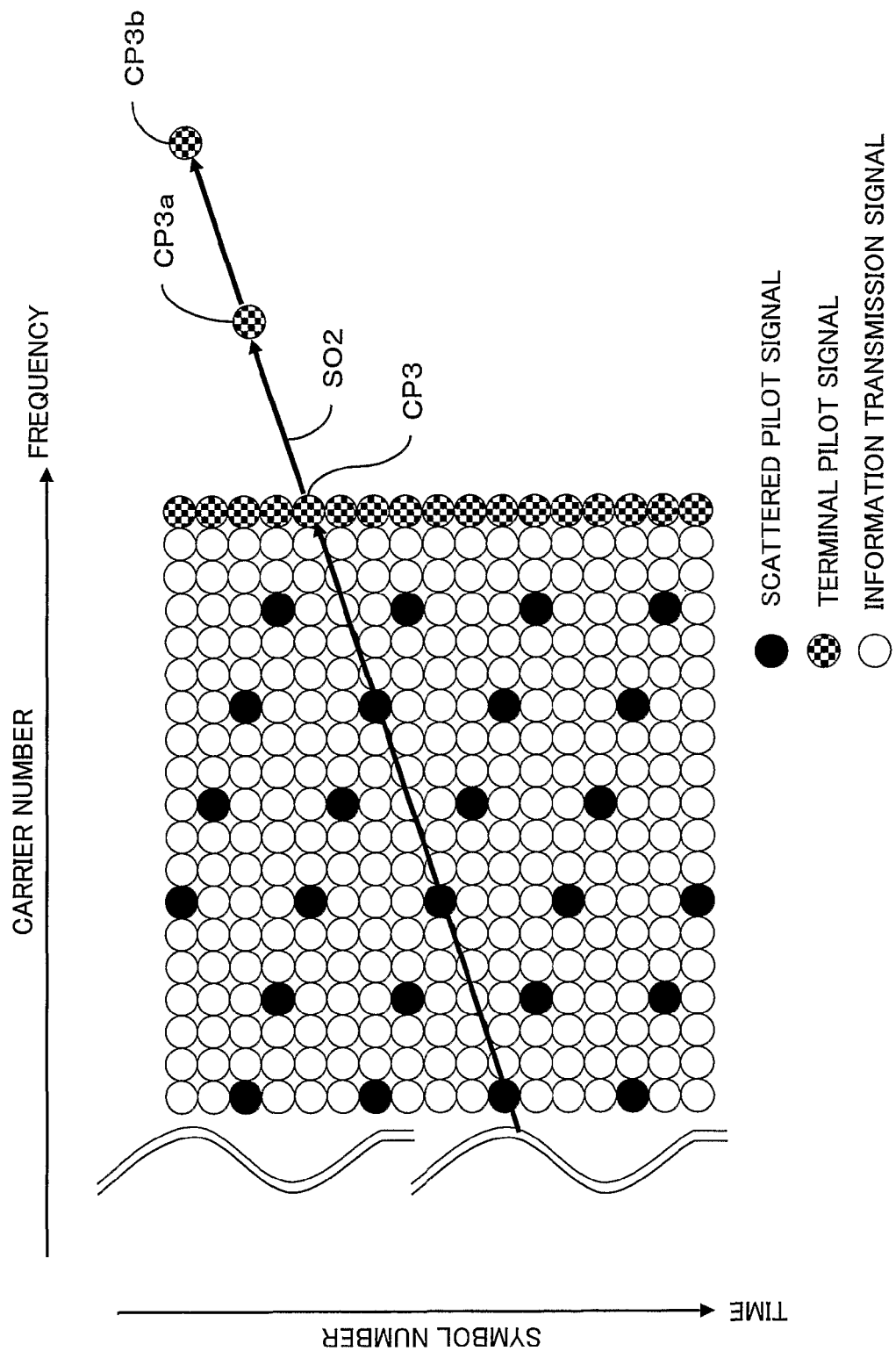
FIG. 19 is a drawing for explaining the other terminal processing performed by a receiver.

The following describes the terminal processing performed on high frequency terminal signals by the above-described oblique interpolation circuit and SP direction filter, with reference to FIG. 19. FIG. 19 is a drawing for explaining the terminal processing performed by the oblique interpolation circuit.

Each of the oblique interpolation circuit and the SP direction filter performs extrapolation of the signal at positions outside the bandwidth, using the CP signals at the terminal. This is performed in such a direction that the symbol number decreases by one in the time axis direction and the carrier number increases by three in the frequency axis direction (the direction indicated by a sign SO2 in FIG. 19). The extrapolation is performed by copying the channel characteristics of the terminal CP signal position on the oblique line.

For instance, the value of a position CP3a and a position CP3b on the arrow SO2, which is extended in the oblique direction, is copied from the value of a CP signal at a terminal position CP3.

Note that in the case of the DVB-T system and the DVB-H system, the CP signals are arranged at the left terminal, and the above-described terminal processing is applicable to those methods as it is.

However, in the case of the ISDB-T system, the CP signals are not arranged at the left terminal, and the above-described terminal processing is not applicable as it is. To perform the terminal processing at the left terminal, the channel characteristics of each SP signal position arranged at the left terminal on the same oblique line are copied for the extrapolation.

<Supplemental Explanations>

(1) The fifth embodiment includes two routes for the interpolation processing, one corresponding to the interpolation processing of the first embodiment, and the other corresponding to the interpolation processing of the second embodiment. One of these routes is selected for equalizing the information transmission signal and so on based on the parameter for the guard interval. However, the present invention is not limited to this, and the following modifications may be made.

Two routes may be provided, namely one for the interpolation corresponding to the first embodiment and one for the interpolation corresponding to the third embodiment (which includes the oblique interpolation, the time axis interpolation and the frequency axis interpolation), and one of the routes may be selected for equalizing the information transmission signal and so on based on the parameter for the guard interval. If this is the case, if the parameter for the guard interval is $1/4$, the interpolation corresponding to the first embodiment is to be selected, and if the parameter for the guard interval is $1/8$, $1/16$ or $1/16$, the interpolation corresponding to the third embodiment is to be selected.

Figure 20:
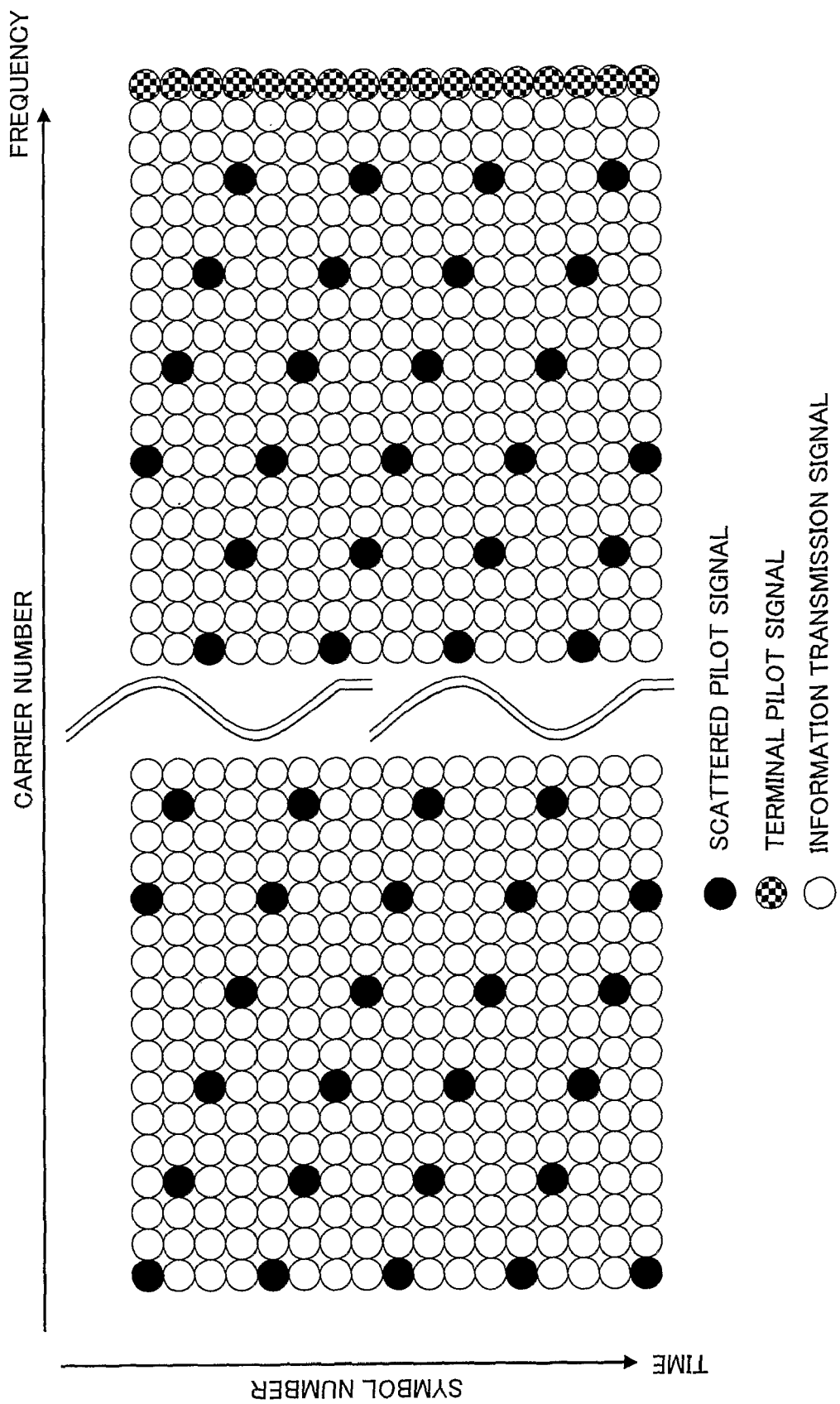
FIG. 20 shows an arrangement of SP signals in an OFDM signal.
Figure 22:
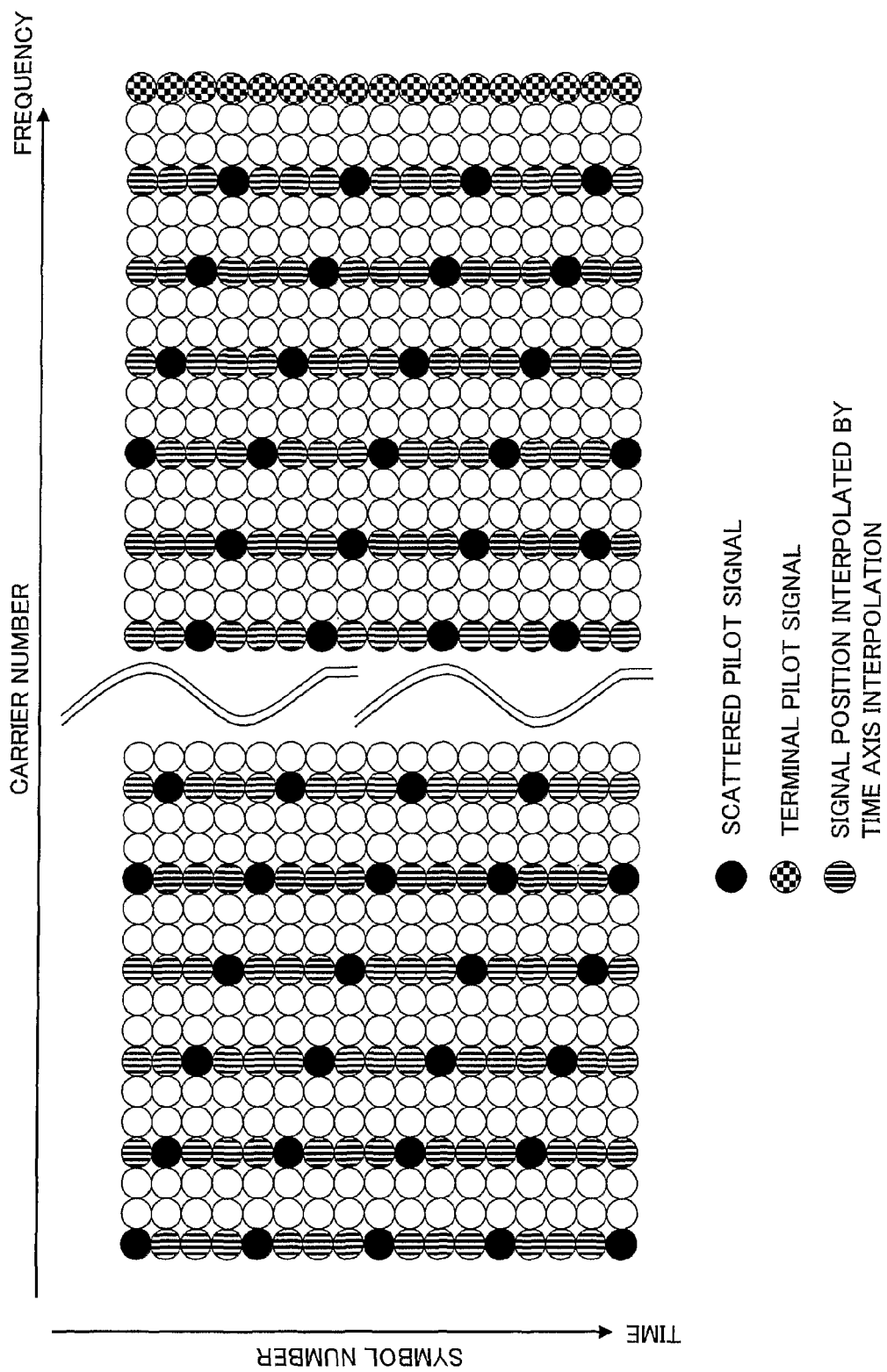
FIG. 22 is a drawing for explaining a conventional time axis interpolation.

Alternatively, other two routes may be provided, namely one for the interpolation corresponding to the conventional technique described above with reference to FIG. 20 to FIG. 22, including the time axis interpolation and the frequency axis interpolation, and the other for the interpolation corresponding to the second embodiment, and one of the routes may be selected for equalizing the information transmission signal and so on based on the parameter for the guard interval. If this is the case, if the parameter for the guard interval is $1/4$, the interpolation processing including the time axis interpolation and the frequency interpolation is to be selected, and if the parameter for the guard interval is $1/8$, $1/16$ or $1/32$, the interpolation processing corresponding to the second embodiment is to be selected. The route for the interpolation corresponding to the second embodiment may be replaced with the route for the interpolation corresponding to the third embodiment. If this is the case, two routes may be provided, namely one for the conventional interpolation processing including the time axis interpolation and the frequency axis interpolation, which is described above with reference to FIG. 20 to 22, and the other for the interpolation corresponding to the third embodiment.

(2) The above-described sixth embodiment includes two routes for the interpolation, which are the route for the interpolation corresponding to the first embodiment, and the route for the interpolation corresponding to the second embodiment. One of these routes is selected for equalizing the information transmission signal and so on based on the maximum value of the delay time of the delayed wave whose level is higher than the predetermined level of the delay profile. However, the present invention is not limited to this. The following modifications may be made.

Two routes may be provided, namely one for the interpolation corresponding to the first embodiment and one for the interpolation corresponding to the third embodiment (which includes the oblique interpolation, the time axis interpolation and the frequency axis interpolation), and one of the routes may be selected for equalizing the information transmission signal and so on based on the maximum value of the delay time of the delayed wave whose level is higher than the predetermined level of the delay profile. If this is the case, if the maximum value of the delay time of the delayed wave, whose level is higher than the level of the predetermined level of the delay profile, is less than or equal to $1/6$ of the effective symbol length, the interpolation corresponding to the third embodiment is to be selected. If the maximum value is more than $1/6$ of the effective symbol length, the interpolation corresponding to the first embodiment is to be selected.

Alternatively, other two routes may be provided, namely one for the interpolation corresponding to the conventional technique described above with reference to FIG. 20 to FIG. 22, including the time axis interpolation and the frequency axis interpolation, and the other for the interpolation corresponding to the second embodiment. One of the routes may be selected for equalizing the information transmission signal and so on based on the maximum value of the delay time of the delayed wave whose level is higher than the predetermined level of the delay profile. If this is the case, if the maximum value of the delay time of the delayed wave, whose level is higher than the level of the predetermined level of the delay profile, is less than or equal to $1/6$ of the effective symbol length, the interpolation corresponding to the second embodiment is to be selected. If the maximum value is more than $1/6$ of the effective symbol length, the interpolation corresponding to the conventional technique is to be selected. The route for the interpolation corresponding to the second embodiment may be replaced with the route for the interpolation corresponding to the third embodiment. If this is the case, two routes may be provided, namely one for the conventional interpolation processing including the time axis interpolation and the frequency axis interpolation, which is described above with reference to FIG. 20 to 22, and the other for the interpolation corresponding to the third embodiment.

Alternatively, three routes may be provided, namely one for the interpolation corresponding to the first embodiment, another one for the interpolation corresponding to the second embodiment, and the other for the interpolation corresponding to the fourth embodiment (including only the frequency axis interpolation). One of the routes may be selected for equalizing the information transmission signal and so on based on the maximum value of the delay time of the delayed wave whose level is higher than the predetermined level of the delay profile. If this is the case, if the maximum value of the delay time of the delayed wave, whose level is higher than the level of the predetermined level of the delay profile, is less than or equal to $1/12$ of the effective symbol length, the interpolation corresponding to the fourth embodiment is to be selected. If the maximum value is more than 1/12 of the effective symbol length and less than or equal to 1/6 of the effective symbol length, the interpolation corresponding to the second embodiment is to be selected. If the maximum value is more than 1/6 of the effective symbol length, the interpolation corresponding to the first embodiment is to be selected.

Alternatively, other three routes may be provided, namely one for the conventional interpolation processing including the time axis interpolation and the frequency axis interpolation, which is described above with reference to FIG. 20 to 22, another for the interpolation corresponding to the second embodiment, and the other for the interpolation described in the fourth embodiment (including only the frequency axis interpolation). One of the routes may be selected for equalizing the information transmission signal and so on based on the maximum value of the delay time of the delayed wave whose level is higher than the predetermined level of the delay profile. If this is the case, if the maximum value of the delay time of the delayed wave, whose level is higher than the level of the predetermined level of the delay profile, is less than or equal to 1/12 of the effective symbol length, the interpolation corresponding to the fourth embodiment is to be selected. If the maximum value is more than 1/12 of the effective symbol length and less than or equal to 1/6 of the effective symbol length, the interpolation corresponding to the second embodiment is to be selected. If the maximum value is more than 1/6 of the effective symbol length, the interpolation corresponding to the conventional embodiment is to be selected.

(3) In the sixth embodiment, the case of the DVB-H system is taken as an example, in which the last symbol in the one burst is used for analyzing the delay profile, and interpolation processing used for the next burst is selected using the analysis result. However, the present invention is not limited to this. The following modifications may be made.

In the case of the DVB-T system and the ISDB-T system, the output from the quadrature demodulator circuit 103 is input to the FFT/IFFT circuit 104e. The FFT/IFFT circuit 104e performs the Inverse Fast Fourier Transform on the signal provided by the quadrature demodulator circuit 103 at the time of an initial lead-in after the power-on, and provides the resultant signal to the delay profile analysis circuit 215. The delay profile analysis circuit 215 analyzes the signal provided by the FFT/IFFT circuit 104e, and the maximum value of the delay time of the delayed wave to the selection circuit 223e. The selection circuit 223e selects the route for the interpolation based on the maximum value. After the initial lead-in, the FFT/IFFT circuit 104e switches the processing to the FFT processing, and performs the Fast Fourier Transform on the signal provided by the quadrature demodulator circuit 103, and outputs the resultant signal to the delay circuit 200 and the SP extraction circuit 201. In this case, the selection circuit 231 is not required.

(4) The fifth embodiment includes three routes for the interpolation processing, one corresponding to the interpolation processing of the first embodiment, another corresponding to the interpolation processing of the second embodiment, and the other corresponding to the interpolation processing of the fourth embodiment. One of these routes is selected for equalizing the information transmission signal and so on based on the parameter for the guard interval. However, the present invention is not limited to this, and the following modifications may be made.

Three routes may be provided, namely one for the conventional interpolation processing including the time axis interpolation and the frequency axis interpolation, which is described above with reference to FIG. 20 to 22, another for the interpolation corresponding to the second embodiment, and the other for the interpolation described in the fourth embodiment. One of the routes may be selected for equalizing the information transmission signal and so on based on the parameter for the guard interval. If this is the case, if the parameter for the guard interval is 1/4, the interpolation processing corresponding to the conventional technique is to be selected, and if the parameter for the guard interval is 1/8, the interpolation processing corresponding to the second embodiment is to be selected, and if the parameter for the guard interval is 1/16 or 1/32, the interpolation processing corresponding to the fourth embodiment is to be selected.

(5) After the SP direction filter 251 performs the filtering, the above-described eighth embodiment performs three types of interpolation corresponding to the third embodiment, including the oblique interpolation, the time axis interpolation and the frequency axis interpolation. However, the present invention is not limited to this. The following modifications may be made.

After the SP direction filter 251 performs the filtering, the two types of interpolation corresponding to the first embodiment including the oblique interpolation and the frequency axis interpolation may be performed. Alternatively, after the SP direction filter 251 performs the filtering, the two types of interpolation corresponding to the second embodiment including the oblique interpolation and the frequency axis interpolation may be performed. In the case of performing the two types of the interpolation corresponding to the second embodiment, if the filtering is performed by the SP direction filter 251, the delay time of the delayed wave that can be equalized does not become short. This is the same as the case of performing the interpolation corresponding to the third embodiment.

(6) In the above-described eighth embodiment, the SP direction filter 251 is a 3-tap filter. However, the number of taps may be larger than three. The noise reduction effect increases as the number of taps increases.

(7) The ninth embodiment includes the delay adjusting circuit 262 and the delay adjusting circuit 263. However, the present invention is not limited to this. Since the difference between the delay of the route including the symbol interpolation circuit 261, and the delay of the route including the SP direction filter 251, the oblique interpolation circuit 205a and the symbol interpolation circuit 210, is required to be adjusted only as to the carrier number based on the tap coefficient, it is possible to include only the delay adjusting circuit 262.

(8) In the above-described ninth embodiment, the circuit unit including the SP direction filter 251, the oblique interpolation circuit 205a and the symbol interpolation circuit 210 may be replaced with a circuit unit including the SP direction filter 251 and the oblique interpolation circuit 205a, or with a circuit unit including the oblique interpolation circuit 205a and the symbol interpolation circuit 210.

(9) In the above-described ninth embodiment, the route used for the interpolation is switched based on the parameter for the guard interval. However, the present invention is not limited to this. The following modifications may be made.

The ninth embodiment may include the circuit unit described in the sixth embodiment (including the selection circuit 231, the FFT/IFFT circuit 104e and the delay profile analysis circuit) for obtaining the delay profile, and the route for the interpolation may be switched based on the parameter for the guard interval and the delay profile.

If this is the case, if the parameter for the guard interval is ⅛, 1/16 or 1/32, the selection circuit 223h selects the input from the delay adjusting circuit 263, and outputs the input to the interpolation circuit 206b.

Also, in the case where the parameter for the guard interval is ¼, if the maximum value of the delay time of the delayed wave, whose level is higher than the predetermined level of the delay profile, is less than ⅛ of the effective symbol length, the selection circuit 223h selects the input from the delay adjusting circuit 263 and outputs the input to the carrier interpolation circuit 206b, and if the maximum value is equal to or more than ⅛ of the effective symbol length, the selection circuit 223h selects the input from the delay adjusting circuit 262, and outputs the input to the carrier interpolation circuit 206b.

Also, in the case of the parameter for the guard interval is ¼, if the maximum value is less than the predetermined, but more than ⅛ of the effective symbol length, and the moving speed of the receiver is equal to or more than the predetermined value, one with higher reception performance may be selected based on the CN ratio or the BER (Bit Error Rate).

(10) In the fifth to seventh embodiments and the ninth to tenth embodiments, the selection of the interpolation may be performed using the maximum Doppler frequency. If this is the case, the interpolation that can manage the maximum Doppler frequency is selected, and if more than two routes for the interpolation can manage the maximum Doppler frequency, one that can manage longer delay time is to be selected.

The maximum Doppler frequency can be derived based on the tuned channel and the moving speed of the receiver. For instance, if the receiver is mounted on a car, a signal indicating the speed may be input to the receiver from the speed meter of the car.

Also, the maximum Doppler frequency may be estimated from the received OFDM signal itself. For instance, in the tenth embodiment, a scatter value, which indicates the variation of the SP signals at the same carrier position, may be detected for each of four symbols, and the average of the scatter value for each of the four symbols is taken. If the average is more than a predetermined value, the selection circuit 223i selects the input from the delay adjusting circuit 272, and outputs the input to the complex division circuit 207. If the average is equal to or less than the predetermined value, the selection circuit 223i selects the input from the delay adjusting circuit 271, and outputs the input to the complex division circuit 207.

(11) In each of the above-described embodiments, the oblique interpolation, the time axis interpolation and the frequency axis interpolation may be realized by any method, including the linear interpolation and interpolation using a long-tap filter.

(12) In each of the above-described embodiments, the SP signals are scattered every twelve sub-carriers arranged in the frequency axis direction, and the position of the SP signal is shifted by three sub-carriers as the symbol number increases by one. However, the present invention is not limited to this. Any arrangement is acceptable as long as the SP signals are scattered every predetermined number of sub-carriers arranged in the frequency axis direction, and shifted by predetermined number of sub-carriers in the frequency axis direction as the symbol number increases by one.

(13) The receiver in each of the above-described embodiments may be realized by a LSI (Large Scale Integration), which is an integrated circuit. Each individual circuit may be realized by one chip, and alternatively, all the circuits or some of the circuits may be realized by one chip. For instance, the tuner unit 101 and the other circuits may be integrated on the same chip, or may be mounted on different chips.

The LSI mentioned above may be called differently depending on the degree of the integration. For instance, it may be called IC (Integrated Circuit), system LSI, super LSI, or ultra LSI.

The integration might not be realized by the LSI. It may be realized by a dedicated circuit or a multipurpose processor. Also, FPGA (Field Programmable Gate Array), which is programmable after the LSI is manufactured, or a reconfigurable processor, whose internal circuit-cell connection and configuration are reconfigurable, may be used.

Further, if a new technology that can replace the LSI is developed based on the LSI technique or derived from the LSI technique, the new technology may naturally be used for the integration of the functional blocks. Biotechnologies may possibly be applied.

The present invention is applicable to a receiver that receives an OFDM signal in which Scattered Pilot Signals are arranged.

The invention claimed is:

1. A receiver for receiving an OFDM signal in which each Scattered Pilot Signal of a plurality of Scattered Pilot Signals is scattered every first predetermined number of carriers arranged in a frequency axis direction, and shifted by a second predetermined number of carriers as a symbol number increases by one, the receiver comprising:
   a first division unit operable to divide each Scattered Pilot Signal by a known signal, which is the same as a Scattered Pilot Signal at a time of transmission, to estimate channel characteristics of a position of each Scattered Pilot Signal;
   an interpolation unit operable (i) to perform oblique interpolation using the estimated channel characteristics, to interpolate channel characteristics of a first signal position whose channel characteristics have not been obtained, the position of the Scattered Pilot Signal and the first signal position being on a same straight line and having different symbol numbers and different carrier numbers, and (ii) to perform, in a frequency axis direction, frequency axis interpolation using the estimated channel characteristics and the interpolated channel characteristics, to interpolate channel characteristics of a second signal position whose channel characteristics have not been obtained; and
   a second division unit operable to divide an information transmission signal, which is included in the OFDM signal, by the interpolated channel characteristics.

2. The receiver of claim 1, wherein
the first predetermined number is twelve and the second predetermined number is three, and
the interpolation unit performs the oblique interpolation in such a direction that the symbol number increases by one and the carrier number decreases by one with respect to the position of each Scattered Pilot Signal.

3. The receiver of claim 1, wherein
the interpolation unit performs the oblique interpolation in such a direction that the symbol number increases by one and the carrier number decreases by the second predetermined number with respect to the position of each Scattered Pilot Signal.

4. The receiver of claim 1, wherein
the first predetermined number is twelve and the second predetermined number is three, and the interpolation unit performs the oblique interpolation in such a direction that the symbol number increases by one and the carrier number decreases by three with respect to the position of each Scattered Pilot Signal.

5. The receiver of claim 3, wherein
after performing the oblique interpolation, the interpolation unit performs, in a time axis direction, time axis interpolation using the estimated channel characteristics and the interpolated channel characteristics, to interpolate channel characteristics of a third signal position whose channel characteristics have not been obtained, and then performs the frequency axis interpolation.

6. The receiver of claim 1, wherein
the interpolation unit changes a direction of the oblique interpolation in accordance with a ratio of a guard interval length to an effective symbol length.

7. The receiver of claim 1, wherein
the interpolation unit judges whether to perform the oblique interpolation based on a ratio of a guard interval length to an effective symbol length.

8. The receiver of claim 1, wherein
the interpolation unit replaces, in accordance with a ratio of a guard interval length, the oblique interpolation with time axis interpolation performed in a time axis direction and using the estimated channel characteristics, to interpolate channel characteristics of a third signal position whose channel characteristics have not been obtained.

9. The receiver of claim 1, wherein
the interpolation unit changes a direction of the oblique interpolation in accordance with a maximum delay time of a delayed wave with respect to a principal wave, the maximum delay time being indicated by a delay profile.

10. The receiver of claim 1, wherein
the interpolation unit judges whether to perform the oblique interpolation based on a maximum delay time of a delayed wave with respect to a principal wave, the maximum delay time being indicated by a delay profile.

11. The receiver of claim 1, wherein
the interpolation unit replaces, in accordance with a maximum delay time of a delayed wave with respect to a principal wave, the oblique interpolation with time axis interpolation performed in a time axis direction and using the estimated channel characteristics, to interpolate channel characteristics of a third signal position whose channel characteristics have not been obtained, the delay time being indicated by a delay profile.

12. The receiver of claim 1, further comprising:
a filter unit operable to perform filtering on the estimated channel characteristics in such a direction that both the symbol number and the carrier number change, with respect to the position of each Scattered Pilot Signal, wherein
the interpolation unit uses channel characteristics resultant from the filtering, instead of the estimated channel characteristics.

13. The receiver of claim 4, wherein
after performing the oblique interpolation, the interpolation unit performs, in a time axis direction, time axis interpolation using the estimated channel characteristics and the interpolated channel characteristics, to interpolate channel characteristics of a third signal position whose channel characteristics have not been obtained, and then performs the frequency axis interpolation.

14. An integrated circuit for receiving an OFDM signal in which each Scattered Pilot Signal of a plurality of Scattered Pilot Signals is scattered every first predetermined number of carriers arranged in a frequency axis direction, and shifted by a second predetermined number of carriers as a symbol number increases by one, the integrated circuit comprising:
a first division unit operable to divide each Scattered Pilot Signal by a known signal, which is the same as a Scattered Pilot Signal at a time of transmission, to estimate channel characteristics of a position of each Scattered Pilot Signal;
an interpolation unit operable (i) to perform oblique interpolation using the estimated channel characteristics, to interpolate channel characteristics of a first signal position whose channel characteristics have not been obtained, the position of the Scattered Pilot Signal and the first signal position being on a same straight line and having different symbol numbers and different carrier numbers, and (ii) to perform, in a frequency axis direction, frequency axis interpolation using the estimated channel characteristics and the interpolated channel characteristics, to interpolate channel characteristics of a second signal position whose channel characteristics have not been obtained, and
a second division unit operable to divide an information transmission signal, which is included in the OFDM signal, by the interpolated channel characteristics.

15. A receiving method for receiving an OFDM signal in which each Scattered Pilot Signal of a plurality of Scattered Pilot Signals is scattered every first predetermined number of carriers arranged in a frequency axis direction, and shifted by a second predetermined number of carriers as a symbol number increases by one, the receiving method comprising:
a first division step of dividing each Scattered Pilot Signal by a known signal, which is the same as a Scattered Pilot Signal at a time of transmission, to estimate channel characteristics of a position of each Scattered Pilot Signal;
an interpolation step of (i) performing oblique interpolation using the estimated channel characteristics, to interpolate channel characteristics of a first signal position whose channel characteristics have not been obtained, the position of the Scattered Pilot Signal and the first signal position being on a same straight line and having different symbol numbers and different carrier numbers, and (ii) performing, in a frequency axis direction, frequency axis interpolation using the estimated channel characteristics and the interpolated channel characteristics, to interpolate channel characteristics of a second signal position whose channel characteristics have not been obtained, and
a second division step of dividing an information transmission signal, which is included in the OFDM signal, by the interpolated channel characteristics.

* * * * *